United States Patent
Yatake

(10) Patent No.: US 10,183,502 B2
(45) Date of Patent: Jan. 22, 2019

(54) PRETREATMENT AGENT FOR INK JET TEXTILE PRINTING AND INK JET TEXTILE PRINTING PROCESS

(71) Applicant: Seiko Epson Corporation, Tokyo (JP)

(72) Inventor: Masahiro Yatake, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/419,646

(22) Filed: Jan. 30, 2017

(65) Prior Publication Data

US 2017/0136782 A1    May 18, 2017

Related U.S. Application Data

(63) Continuation of application No. 13/029,370, filed on Feb. 17, 2011, now abandoned.

(30) Foreign Application Priority Data

Feb. 18, 2010  (JP) ................... 2010-033248
Feb. 18, 2010  (JP) ................... 2010-033249
Feb. 18, 2010  (JP) ................... 2010-033250

(51) Int. Cl.
  *B41J 3/407* (2006.01)
  *C09D 11/322* (2014.01)
  *C09D 11/40* (2014.01)
  *C09D 11/54* (2014.01)
  *D06P 1/44* (2006.01)
  *D06P 1/52* (2006.01)
  *D06P 1/673* (2006.01)
  *D06P 5/30* (2006.01)

(52) U.S. Cl.
  CPC .......... *B41J 3/4078* (2013.01); *C09D 11/322* (2013.01); *C09D 11/40* (2013.01); *C09D 11/54* (2013.01); *D06P 1/44* (2013.01); *D06P 1/445* (2013.01); *D06P 1/525* (2013.01); *D06P 1/5242* (2013.01); *D06P 1/5257* (2013.01); *D06P 1/6735* (2013.01); *D06P 1/67341* (2013.01); *D06P 1/67358* (2013.01); *D06P 1/67375* (2013.01); *D06P 5/30* (2013.01)

(58) Field of Classification Search
  CPC B41J 3/4078; D06P 5/30; D06P 1/445; D06P 1/5257; D06P 1/5242; D06P 1/44; D06P 1/525; D06P 1/67341; D06P 1/6735; D06P 1/67358; D06P 1/67375; C09D 11/322; C09D 11/40; C09D 11/54
  See application file for complete search history.

(56) References Cited

U.S. PATENT DOCUMENTS

| | | | |
|---|---|---|---|
| 4,786,288 A | 11/1988 | Handa et al. | |
| 5,609,671 A | 3/1997 | Nagasawa | |
| 6,171,444 B1 | 1/2001 | Nigam | |
| 6,513,924 B1 | 2/2003 | Goldberg et al. | |
| 2004/0204535 A1 | 10/2004 | Confalone et al. | |
| 2006/0234075 A1 | 10/2006 | Watanabe | |
| 2007/0066711 A1* | 3/2007 | Fasano .............. | C09D 11/30 523/160 |
| 2009/0232990 A1 | 9/2009 | Ishiji et al. | |
| 2009/0233064 A1 | 9/2009 | Yatake et al. | |
| 2010/0245416 A1 | 9/2010 | Ohshima et al. | |
| 2010/0295891 A1 | 11/2010 | Goto et al. | |

FOREIGN PATENT DOCUMENTS

| | | | |
|---|---|---|---|
| CN | 101531846 A | 9/2009 | |
| EP | 2078786 A2 | 7/2009 | |
| EP | 2100929 A1 * | 9/2009 | ............ C09D 11/40 |
| JP | 04-35351 B | 6/1992 | |
| JP | 60-81379 A | 3/1994 | |
| JP | 63-31594 A | 12/1994 | |
| JP | 08-3498 A | 1/1996 | |
| JP | 2002-19263 A | 1/2002 | |
| JP | 2003-55886 A | 2/2003 | |
| JP | 2008-266853 A | 11/2008 | |
| JP | 2009-166387 A | 7/2009 | |

OTHER PUBLICATIONS

**Acton, Q.A., ed., Acrylamides. Amides—Advances in Research and Application. Chapter 1, pp. 87-90, ScholarlyEditions, Atlanta, GA, 2013.
U.S. Appl. No. 13/029,370, filed Feb. 17, 2011, Pretreatment Agent for Ink Jet Textile Printing and Ink Jet Textile Printing Process.

* cited by examiner

*Primary Examiner* — Patrick D Niland
(74) *Attorney, Agent, or Firm* — Nutter McClennen & Fish LLP; Alex Nagorniy

(57) ABSTRACT

Provided is a pretreatment agent for ink jet textile printing that can provide printed matters on fabric with high color-developing properties and less bleeding. The pretreatment agent includes at least water and (A) a multivalent metal ion and polymer fine particles, (B) a cationic polymer and polymer fine particles, or (C) cationic polymer fine particles.

12 Claims, No Drawings

PRETREATMENT AGENT FOR INK JET TEXTILE PRINTING AND INK JET TEXTILE PRINTING PROCESS

CROSS-REFERENCE TO RELATED APPLICATIONS

The present application is a continuation of U.S. application Ser. No. 13/029,370, filed on Feb. 17, 2011, which claims priority under 35 U.S.C § 119 to Japanese Patent Application No. 2010-033250 filed in the Japanese Patent Office on Feb. 18, 2010, Japanese Patent Application No. 2010-033249 filed in the Japanese Patent Office on Feb. 18, 2010, and Japanese Patent Application No. 2010-033248 filed in the Japanese Patent Office on Feb. 18, 2010, the disclosures of which are incorporated herein by reference in their entireties.

BACKGROUND

1. Technical Field

The present invention relates to a pretreatment agent for ink jet textile printing that can provide printed matters on fabric with high color-developing properties and less bleeding, and also relates to an ink jet textile printing process using the pretreatment agent.

2. Related Art

Ink jet textile printing has advantages in that labor hours for printing plates, such as producing, storing, and washing of the plates, are not necessary, unlike known textile printing, and that images excellent in gradient can be formed on-demand. The method of printing on fabric by an ink jet system is suitable for producing high-mix, low-volume products, can reduce loads due to liquid waste disposal, and enables a reduction in delivery time, and is, in these respects, superior to existing printing processes, such as screen textile printing.

In printing on fabric by the ink jet system, an ink having a low viscosity of about 10 mPa·s or less is usually used in terms of discharging property, or the fabric is generally subjected to specific pretreatment from the viewpoint of preventing bleeding after printing, since the fabric is insufficient in function of promptly absorbing ink and fixing it. For example, JP-B-63-31594 discloses fabric for ink jet dyeing, wherein the fabric is pretreated with a certain amount of a pretreatment agent composed of a water-soluble polymer substantially not dyeing the dye that dyes the fabric and a water-soluble salt or water-insoluble inorganic fine particles to provide a sharp and clear image.

In addition, for example, JP-B-4-35351 discloses an ink jet textile printing process using a high-temperature reactive dye ink, wherein a cellulose fiber structure is pretreated with an alkaline material, urea, and a nonionic or anionic, water-soluble polymer to enable dyeing deep colors clearly and without bleeding.

The purposes of any of the above-described methods are prevention of bleeding of images and acquisition of clear and high-concentration dyed matters, but the color density and the clearness achieved by these methods are still lower than those of dyed matters obtained by existing screen textile printing. Furthermore, in these pretreatment, processes, in usual, a pretreatment agent is applied to fabric by means of, for example, dipping or coating. However, there are a tendency that bleeding is further increased with a recent increase in printing speed, and thereby a demand for further improvement in pretreatment prescription for preventing bleeding.

At the same time, in order to prevent bleeding in printing on fabric, various methods and technologies have been disclosed. For example, JP-A-60-81379 and JP-2003-55886 disclose methods preventing bleeding by utilizing interaction between components in ink and components applied to fabric by pretreatment. These methods are accompanied by an increase in steps, that is, specific treatment of fabric, and the ink needs to contain an additional component (e.g., gelling adhesive), which causes a problem to deteriorate storage stability of the ink, Furthermore, for example, JP-A-2002-19263 discloses a technology utilizing interaction between an ink and another liquid separately prepared. This method does not need pretreatment of fabric, but cannot be practically used because of insufficient effect of preventing bleeding and deterioration in storage stability of the ink. Therefore, there is a demand for development an ink jet textile printing process that can provide a printed matter having a high color-developing property and being very low in bleeding.

SUMMARY

Advantages of some aspects of the invention are to provide a pretreatment agent for ink jet textile printing that can provide a printed matter having a high color-developing property and being low in bleeding of ink on fabric, an ink composition for ink jet textile printing, an ink jet textile printing process using them, and printed fabric.

An advantage of some aspects of the invention is to solve at least a part of the problems described above, and the invention can be realized as the following aspects or application examples.

Aspect A

Application Example A1

A pretreatment agent for ink jet textile printing in which fabric is pretreated with the pretreatment agent previous to printing of ink on the fabric with an ink jet system contains at least water, a polyvalent metal ion, and polymer fine particles. The polymer fine particles are an acrylic polymer and have a glass transition temperature of −10° C. or less, an acid number of 50 mg KOH/g or less, and a particle diameter of 50 nm or more and 5 μm or less when determined by light scattering.

Application Example A2

The fabric to be pretreated with the pretreatment agent for ink jet textile printing according to Application Example A1 is made of one kind of fiber or blended fiber of two or more selected from the group consisting of cotton, hemp, rayon fiber, acetate fiber, silk, nylon fiber, and polyester fiber.

Application Example A3

An ink jet textile printing process for printing on fabric by an ink jet system includes pretreatment of the fabric with a pretreatment agent containing at least water, a polyvalent metal ion, and polymer fine particles previous to printing of ink on the fabric, wherein the polymer fine particles are an acrylic polymer and have a glass transition temperature of −10° C. or less, an acid number of 50 mg KOH/g or less, and a particle diameter of 50 nm or more and 5 μm or less when determined by light scattering.

Application Example A4

The ink jet textile printing process according to Application Example A3, wherein the fabric is made of one kind of fiber or blended fiber of two or more selected from the group consisting of cotton, hemp, rayon fiber, acetate fiber, silk, nylon fiber, and polyester fiber.

Application Example A5

The ink jet textile printing process according to Application Example A3 or A4, wherein the pretreatment agent has a particle diameter of 1 µm or less and is applied to fabric by an ink jet process.

Application Example A6

The ink jet textile printing process according to any one of Application Examples A3 to A5, wherein the pretreatment agent for ink jet textile printing according to Application Example A1 or A2 and an ink composition for ink jet textile printing are used.

Application Example A7

An ink jet textile printing process according to Application Example A6, wherein the ink composition includes a pigment serving as a color material that is self-dispersing or is dispersed in an acrylic resin.

Aspect B

Application Example B1

A pretreatment agent for ink jet textile printing in which fabric is pretreated with the pretreatment agent previous to printing of ink on the fabric with an ink jet system contains at least water, a cationic polymer, and polymer fine particles. The polymer fine particles are an acrylic polymer and have a glass transition temperature of −10° C. or less, a mass-average molecular weight of 100000 or more, and a particle diameter of 50 nm or more and 5 µm or less when determined by light scattering.

Application Example B2

The fabric to be pretreated with the pretreatment agent for ink jet textile printing according to Application Example B1 is made of one kind of fiber or blended fiber of two or more selected from the group consisting of cotton, hemp, rayon fiber, acetate fiber, silk, nylon fiber, and polyester fiber.

Application Example B3

An ink jet textile printing process for printing on fabric by an ink jet system includes pretreatment of the fabric with a pretreatment agent containing at least water, a cationic polymer, and polymer fine particles previous to printing of ink on the fabric, wherein the polymer fine particles are an acrylic polymer and have a glass transition temperature of −10° C. or less, a mass-average molecular weight of 100000 or more, and a particle diameter of 50 nm or more and 5 µm or less when determined by light scattering.

Application Example B4

The ink jet textile printing process according to Application Example B3, wherein the fabric is made of one kind of fiber or blended fiber of two or more selected from the group consisting of cotton, hemp, rayon fiber, acetate fiber, silk, nylon fiber, and polyester fiber.

Application Example B5

The ink jet textile printing process according to Application Example B3 or B4, wherein the pretreatment agent has a particle diameter of 1 µm or less and is applied to fabric by an ink jet process.

Application Example B6

The ink jet textile printing process according to any one of Application Examples B3 to B5, wherein the pretreatment agent for ink jet textile printing according to Application Example B1 or B2 and an ink composition for ink jet textile printing are used.

Application Example B7

An ink jet textile printing process according to Application Example B6, wherein the ink composition includes a pigment serving as a color material that is self-dispersing or is dispersed in an acrylic resin.

Aspect C

Application Example C1

A pretreatment agent for ink jet textile printing in which fabric is pretreated with the pretreatment agent previous to printing of ink on the fabric with an ink jet system contains at least water and cationic polymer fine particles. The cationic polymer fine particles have a glass transition temperature of −10° C. or less, a mass-average molecular weight of 100000 or more, and a particle diameter of 50 nm or more and 5 µm or less when determined by light scattering.

Application Example C2

The fabric to be pretreated with the pretreatment agent for ink jet textile printing according to Application Example C1 is made of one kind of fiber or blended fiber of two or more selected from the group consisting of cotton, hemp, rayon fiber, acetate fiber, silk, nylon fiber, and polyester fiber.

Application Example C3

An ink jet textile printing process for printing on fabric by an ink jet system includes pretreatment of the fabric with a pretreatment agent containing at least water and cationic polymer fine particles previous to printing of ink on the fabric, wherein the cationic polymer fine particles have a glass transition temperature of −10° C. or less, a mass-average molecular weight of 100000 or more, and a particle diameter of 50 nm or more and 5 µm or less when determined by light scattering.

Application Example C4

The ink jet textile printing process according to Application Example C3, wherein the fabric is made of one kind of fiber or blended fiber of two or more selected from the group consisting of cotton, hemp, rayon fiber, acetate fiber, silk, nylon fiber, and polyester fiber.

Application Example C5

The ink jet textile printing process according to Application Example C3 or C4, wherein the pretreatment agent has a particle diameter of 1 µm or less and is applied to fabric by an ink jet process.

Application Example C6

The ink jet textile printing process according to any one of Application Examples C3 to C5, wherein the pretreatment agent for ink jet textile printing according to Application Example C1 or C2 and an ink composition for ink jet textile printing are used.

Application Example C7

An ink jet textile printing process according to Application Example C6, wherein the ink composition includes a pigment serving as a color material that is self-dispersing or is dispersed in an acrylic resin.

According to aspects of the invention, provided are a pretreatment agent for ink jet textile printing that can provide a printed matter having a high color-developing property and being low in bleeding of ink on fabric, an ink composition for ink jet textile printing, an ink jet textile printing process using them, and printed fabric.

DESCRIPTION OF EXEMPLARY EMBODIMENTS

Embodiment A

The present inventors have conducted intensive studies and have found that in an ink jet textile printing process for printing on fabric by an ink jet system including pretreatment of the fabric with a pretreatment agent containing at least water, a polyvalent metal ion, and polymer fine particles previous to printing of ink on the fabric, a printed matter having a high color developing property and being low in bleeding of ink can be formed on the fabric, when the polymer fine particles are an acrylic polymer and have a glass transition temperature of −10° C. or less, an acid number of 50 mg KOH/g or less, and a particle diameter of 50 nm or more and 5 µm or less when determined by light scattering.

Embodiment B

The inventors have also found that as another embodiment, in an ink jet textile printing process for printing on fabric by an ink jet system including pretreatment of the fabric with a pretreatment agent containing at least water, a cationic polymer, and polymer fine particles previous to printing of ink on the fabric, a printed matter having a high color-developing property and being low in bleeding of ink can be formed on the fabric, when the polymer fine particles are an acrylic polymer and have a glass transition temperature of −10° C. or less, a mass-average molecular weight of 100000 or more, and a particle diameter of 50 nm or more and 5 µm or less when determined by light scattering.

Embodiment C

The inventors have also found that as another embodiment, in an ink jet textile printing process for printing on fabric by an ink jet system including pretreatment of the fabric with a pretreatment agent containing at least water and cationic polymer fine particles previous to printing of ink on the fabric, a printed matter having a high color-developing property and being low in bleeding of ink can be formed on the fabric, when the cationic polymer fine particles have a glass transition temperature of −10° C. or less, a mass-average molecular weight of 100000 or more, and a particle diameter of 50 nm or more and 5 µm or less when determined by light scattering.

The inventors have also found that the above-mentioned effects of the invention can be further enhanced when any of the pretreatment agents A to C for ink jet textile printing having the compositions defined in Embodiments A to C is applied to fabric made of one kind of fiber or blended fiber of two or more selected from the group consisting of cotton, hemp, rayon fiber, acetate fiber, silk, nylon fiber, and polyester fiber.

Embodiments according to some aspects of the invention will be described in detail below.

In this embodiment, a printed matter formed on fabric by the ink jet textile printing process using a pretreatment agent for ink jet textile printing is obtained by pretreating the fabric with the pretreatment agent for ink jet textile printing (hereinafter also simply referred to as "pretreatment agent"), subsequently, applying ink containing a color material by an ink jet system onto the fabric, which contains fiber capable of being printed, and then performing at least heat treatment to complete the printing on the fabric.

The pretreatment agent for ink jet textile printing will now be described.

Pretreatment Agent A for Ink Jet Textile Printing

The pretreatment agent of Embodiment A contains at least water, a polyvalent metal ion, and polymer fine particles and is used in ink jet textile printing in which fabric is pretreated with the pretreatment agent previous to printing of ink on the fabric by an ink jet system, wherein the polymer fine particles are an acrylic polymer and have a glass transition temperature of −10° C. or less, an acid number of 50 mg KOH/g or less, and a particle diameter of 50 nm or more and 5 µm or less when determined by light scattering.

The glass transition temperature of the polymer fine particles is preferably −10° C. or less. A glass transition temperature higher than −10° C. causes a decrease in property fixing to fabric. The glass transition temperature is preferably −15° C. or less and more preferably −20° C. or less. The acid number of the polymer fine particles contained in the pretreatment agent is preferably 50 mg KOH/g or less. If the acid number is higher than 50 mg KOH/g, the stability of the pretreatment agent is deteriorated by the influence of the polyvalent metal ion contained in the pretreatment agent. Furthermore, the particle diameter of the polymer fine particles contained in the pretreatment agent is preferably 50 nm or more and 5 µm or less. If the particle diameter is smaller than 50 nm, the stability of the pretreatment agent is deteriorated by the influence of the coexisting polyvalent metal ion. If the particle diameter is larger than 5 µm, the ink is not well spread on fabric, resulting in deterioration in fixing property.

The polymer fine particles contained in the pretreatment agent preferably has a styrene-reduced mass average molecular weight of 100000 to 1000000 when determined by gel permeation chromatography (GPC). Within this range, the fixing property of the pigment of a printed matter on fabric is improved. The styrene-reduced mass-average molecular weight is more preferably 100000 to 300000 and most preferably 130000 to 200000. A styrene-reduced mass-average molecular weight of smaller than 100000 reduces washing fastness of the printed matter on fabric.

The acrylic polymer constituting the polymer fine particles contained in the pretreatment agent is an alkyl (meth)acrylate and/or cyclic alkyl (meth)acrylate and is preferably an alkyl (meth)acrylate having 1 to 24 carbon atoms and/or cyclic alkyl (meth)acrylate having 3 to 24 carbon atoms. Examples of the acrylic polymer include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)

acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate.

The content of the alkyl (meth)acrylate and/or the cyclic alkyl (meth)acrylate is preferably 70% by mass (hereinafter simply referred to as "%" unless otherwise noted) or more based on the total mass of the polymer fine particles. Within this range, the rubbing fastness in both dry and wet rubbing and the dry-cleaning resistance of a printed matter on fabric are further improved.

The acid that can be used in the acrylic polymer is preferably an organic compound having, for example, sulfonic acid, sulfamic acid, silicic acid, metasilisic acid, phosphoric acid, metaphosphoric acid, boric acid, or thiosulfuric acid. An acid having a carboxyl group aggregates with the polyvalent metal ion and, therefore, is not preferred.

The average particle diameter of the polymer fine particles is measured by light scattering. The particle diameter of the polymer fine particles determined by the light scattering is preferably 50 nm or more and 500 nm or less, more preferably 60 nm or more and 300 nm or less. If the particle diameter is smaller than 50 nm, the fixing property of a printed matter on fabric decreases, and if the particle diameter is larger than 500 nm, dispersion stability decreases. Furthermore, when a pigment fixing solution is ink jet printed, the discharge from an ink jet head tends to be unstable.

Examples of the multivalent metal ion that can be contained in the pretreatment agent include water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on the carboxyl groups on the surface of the pigment in the ink, a dispersing polymer, or the polymer fine particles contained in the ink to prevent the ink from permeating into fabric. As a result, the ink remains on the surface of the fabric to improve the color-developing property. Therefore, it is necessary that any of the surface of the pigment in the ink, the dispersing polymer, and the polymer fine particles contained in the ink has a carboxyl group.

The pretreatment agent may contain a water-soluble organic solvent. Examples of the water-soluble organic solvent include polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butylene glycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides (e.g., N,N-dimethylformamide), heterocycles (e.g., 2-pyrrolidone and N-methyl-2-pyrrolidone), and acetonitrile.

Pretreatment Agent B for Ink Jet Textile Printing

The pretreatment agent of Embodiment B contains at least water, a cationic polymer, and polymer fine particles and is used in ink jet textile printing in which fabric is pretreated with the pretreatment agent previous to printing of ink on the fabric by an ink jet system, wherein the polymer fine particles are an acrylic polymer and have a glass transition temperature of −10° C. or less, a mass-average molecular weight of 100000 or more, and a particle diameter of 50 nm or more and 5 μm or less when determined by light scattering.

The glass transition temperature of the polymer fine particles is preferably −10° C. or less. A glass transition temperature higher than −10° C. causes a decrease in property fixing to fabric. The glass transition temperature is preferably −15° C. or less and more preferably −20° C. or less. The acid number of the polymer fine particles contained in the pretreatment agent is preferably 50 mg KOH/g or less. If the acid number is higher than 50 mg KOH/g, the stability of the pretreatment agent is deteriorated by the influence of the cationic polymer contained in the pretreatment agent. Furthermore, the particle diameter of the polymer fine particles contained in the pretreatment agent is preferably 50 nm or more and 5 μm or less. If the particle diameter is smaller than 50 nm, the stability of the pretreatment agent is deteriorated by the influence of the coexisting cationic polymer. If the particle diameter is larger than 5 μm, the ink does not well spread on fabric, resulting in deterioration in fixing property.

The polymer fine particles contained in the pretreatment agent preferably has a styrene-reduced mass-average molecular weight of 100000 to 1000000 when determined by gel permeation chromatography (GPC). Within this range, the fixing property of the pigment of a printed matter on fabric is improved. The styrene-reduced mass-average molecular weight is more preferably 100000 to 300000 and most preferably 130000 to 200000. A styrene-reduced mass-average molecular weight of smaller than 100000 reduces washing fastness of the printed matter on fabric.

The acrylic polymer constituting the polymer fine particles contained in the pretreatment agent is an alkyl (meth)acrylate and/or cyclic alkyl (meth)acrylate and is preferably an alkyl (meth)acrylate having 1 to 24 carbon atoms and/or cyclic alkyl (meth)acrylate having 3 to 24 carbon atoms. Examples of the acrylic polymer include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate.

The content of the alkyl (meth)acrylate and/or the cyclic alkyl (meth)acrylate is preferably 70% or more based on the total amount of the polymer fine particles. Within this range, the rubbing fastness in both dry and wet rubbing and the dry-cleaning resistance of a printed matter on fabric are further improved.

The acid that can be used in the acrylic polymer is preferably an organic compound having, for example, sulfonic acid, sulfamic acid, silicic acid, metasilisic acid, phosphoric acid, metaphosphoric acid, boric acid, or thiosulfuric acid. An acid having a carboxyl group aggregates with the cationic polymer and, therefore, is not preferred.

The average particle diameter of the polymer fine particles is measured by light scattering. The particle diameter of the polymer fine particles determined by the light scattering is preferably 50 nm or more and 500 nm or less, more preferably 60 nm or more and 300 nm or less. If the particle diameter is smaller than 50 nm, the fixing property of a printed matter on fabric decreases, and if the particle diameter is larger than 500 nm, dispersion stability decreases. Furthermore, when a pigment fixing solution is ink jet printed, the discharge of the solution from an ink jet head tends to be unstable.

Examples of the cationic polymer that can be contained in the pretreatment agent include polyallylamine, polyallylamine sulfate, polyallylamine hydrochloride, allylamine/diallylamine copolymer, allylamine/diallylamine copolymer sulfate, allylamine/diallylamine copolymer hydrochloride, allylamine/dimethylallylamine, allylamine/dimethylallylamine copolymer sulfate, allylamine/dimethylallylamine copolymer hydrochloride, diallylamine, diallylamine sulfate, diallylamine hydrochloride, methyldiallylamine amide, methyldiallylamine amide sulfate, methyldiallylamine amide hydrochloride, diallylamine sulfur dioxide copolymer, diallylamine sulfur dioxide copolymer sulfate, diallylamine sulfur dioxide copolymer hydrochloride, methyl diallylamine sulfur dioxide copolymer, methyldiallylamine sulfur dioxide copolymer sulfate, and methyldiallylamine sulfur dioxide copolymer hydrochloride. These cationic polymers are commercially available, for example, from Nitto Boseki Co., Ltd. as PAA series or PAS series. These cationic polymers have a function of aggregating ink by acting on the carboxyl groups on the surface of the pigment in the ink, a dispersing polymer, or the polymer fine particles contained in the ink to prevent the ink from permeating into fabric. As a result, the ink remains on the surface of the fabric to improve the color-developing property. Therefore, it is necessary that any of the surface of the pigment in the ink, the dispersing polymer, and the polymer fine particles contained in the ink has a carboxyl group.

In this embodiment, the polymer fine particles are contained in the pretreatment agent together with the cationic polymer for improving the fixing property of the color material. Therefore, the cationic polymer itself may be the polymer fine particles as long as the above-mentioned function is achieved. Accordingly, the polymer fine particles may be a copolymer of a monomer that forms the cationic polymer and a monomer having a vinyl group, such as acrylate, methacrylate, allylate, or styrene.

The pretreatment agent may contain a water-soluble organic solvent, and examples of the solvent are the same as those contained in the pretreatment agent of Embodiment A.

Pretreatment Agent C for Ink Jet Textile Printing

The pretreatment agent of Embodiment C contains at least water and cationic polymer fine particles and is used in ink jet textile printing in which fabric is pretreated with the pretreatment agent previous to printing of ink on the fabric by an ink jet system, wherein the cationic polymer fine particles have a glass transition temperature of −10° C. or less, a mass-average molecular weight of 100000 or more, and a particle diameter of 50 nm or more and 5 μm or less when determined by light scattering.

The glass transition temperature of the cationic polymer fine particles is preferably −10° C. or less. A glass transition temperature higher than −10° C. causes a decrease in property fixing to fabric. The glass transition temperature is preferably −15° C. or less and more preferably −20° C. or less. The cationic polymer fine particles contained in the pretreatment agent preferably has a styrene-reduced mass-average molecular weight of 100000 to 1000000 when determined by gel permeation chromatography (GPC). Within this range, the fixing property of the pigment of a printed matter on fabric is improved. The styrene-reduced mass-average molecular weight is more preferably 100000 to 300000 and most preferably 130000 to 200000. A styrene-reduced mass-average molecular weight of smaller than 100000 reduces washing fastness of the printed matter on fabric. Furthermore, the particle diameter of the cationic polymer fine particles contained in the pretreatment agent is preferably 50 nm or more and 5 μm or less. If the particle diameter is smaller than 50 nm, the stability of the pretreatment agent is deteriorated by the influence of the coexisting cationic polymer. If the particle diameter is larger than 5 μm, the ink does not well spread on fabric, resulting in deterioration in fixing property.

The cationic polymer fine particles contain alkyl (meth)acrylate and/or cyclic alkyl (meth)acrylate as a structural component. The alkyl (meth)acrylate and/or cyclic alkyl (meth)acrylate are preferably alkyl (meth)acrylate having 1 to 24 carbon atoms and/or cyclic alkyl (meth)acrylate having 3 to 24 carbon atoms, and examples thereof include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethyl hexyl (meth)acrylate, octyl ((meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate.

The content of the alkyl (meth)acrylate and/or the cyclic alkyl (meth)acrylate is preferably 70% or more based on the total amount of the cationic polymer fine particles. Within this range, the rubbing fastness in both dry and wet rubbing and the dry-cleaning resistance of a printed matter on fabric are further improved.

The cationic monomer as a component of the cationic polymer fine particles that can be contained in the pretreatment agent is, for example, one or more selected from allylamine, allylamine sulfate, allylamine hydrochloride, diallylamine, diallylamine sulfate, diallylamine hydrochloride, dimethylallylamine, dimethylallylamine sulfate, dimethylallylamine hydrochloride, methyldiallylamine amide, methyldiallylamine amide sulfate, and methyldiallylamine amide hydrochloride.

These cationic polymer fine particles have a function of aggregating ink by acting on the carboxyl groups on the surface of the pigment in the ink, a dispersing polymer, or the polymer fine particles contained in the ink to prevent the ink from permeating into fabric. As a result, the ink remains on the surface of the fabric to improve the color-developing property. Therefore, it is necessary that any of the surface of the pigment in the ink, the dispersing polymer, and the polymer fine particles contained in the ink has a carboxyl group.

The average particle diameter of the cationic polymer fine particles is measured by light scattering. The particle diameter of the cationic polymer fine particles determined by the light scattering is preferably 50 nm or more and 500 nm or less, more preferably 60 nm or more and 300 nm or less. If the particle diameter is smaller than 50 nm, the fixing property of a printed matter on fabric decreases, and if the particle diameter is larger than 500 nm, dispersion stability decreases. Furthermore, when a pigment fixing solution is ink jet printed, the discharge of the solution from an ink jet head tends to be unstable.

Each of the pretreatment agents according to Embodiments A to C may contain a water-soluble organic solvent. Examples of the water-soluble organic solvent include polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butylene glycol, 1,6-hexanediol, 1,2-hexanediol, 1,5-pentanediol, 1,2-pentanediol, 2,2-dimethyl-1,3-propanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides (e.g., N,N-dimethylformamide), heterocycles (e.g., 2-pyrrolidone and N-methyl-2-pyrrolidone), and acetonitrile.

The pretreatment agent may contain a water-soluble organic solvent, and examples of the solvent are the same as those contained in the pretreatment agent of Embodiment A.

In the ink jet textile printing process, the pretreatment agent can be applied to fabric by a known application process, for example, spray, coating, or pad printing. Alternatively, the pretreatment agent may be applied to fabric using an ink jet head. When the pretreatment agent is applied to fabric with an ink jet head, the particle diameter of the polymer fine particles or the cationic polymer fine particles is preferably 50 nm or more and 1 µm or less when determined by light scattering. A particle diameter larger than 1 µm tends to cause a deterioration in stability of discharge from the ink jet head. The particle diameter is more preferably 500 nm or less.

The ink jet textile printing process will now be described.

Ink Jet Textile Printing Process

In the ink jet textile printing process according to an aspect of the invention, fabric is pretreated with the pretreatment agent A, B, or C previous to printing of ink on the fabric.

The fabric used in the ink jet textile printing process according to an aspect of the invention is made of one kind of fiber or blended fiber of two or more selected from the group consisting of cotton, hemp, rayon fiber, acetate fiber, silk, nylon fiber, and polyester fiber. In this embodiment, among the above-mentioned fabric, in particular, cotton, hemp, rayon fiber, and acetate fiber are high in color-developing property, low in bleeding of ink, and excellent in fixing property and are therefore preferred, and cotton is most preferred.

The ink jet textile printing process is completed through the step of treating fabric made of one kind of fiber or blended fiber of two or more selected from the group consisting of cotton, hemp, rayon fiber, acetate fiber, silk, nylon fiber, and polyester fiber with the pretreatment agent, the step of ink jet printing, and the step of heating the printed matter on the fabric at least at a temperature of 110 to 200° C. for 1 minute of more. The method of the ink jet printing is not particularly limited and can be performed by a known process.

In the process of producing a printed matter on fabric, when the heating temperature in the heat treatment is lower than 110° C., the fixing property of the printed matter on the fabric is hardly improved. On the contrary, when the temperature is higher than 200° C., the fabric, the pigment, and the polymer themselves are degraded. Accordingly, the heating temperature is preferably 120° C. or more and 170° C. or less. The heating time needs at least 1 minute and is preferably 2 minutes or more.

The material constituting the fabric used in the ink jet textile printing process is not particularly limited, but is preferably one kind of fiber or blended fiber of two or more selected from the group consisting of cotton, hemp, rayon fiber, acetate fiber, silk, nylon fiber, and polyester fiber. Among them, fabric containing at least cotton fiber is particularly preferred. The fabric may be in any form, for example, a woven, knitted, or nonwoven form of the above-mentioned fiber. As the fabric that can be used in this embodiment, mixed woven or mixed non-woven fabric can be also used as the fabric for the textile printing. The size of the yarn constituting the fabric like the above is preferably within the range of 10 to 100 deniers.

In the ink jet textile printing process, in order to obtain a uniform printed matter on fabric, it is desirable to wash out impurities adhering to the fabric, such as fat and oil, wax, pectic substance, or coloring matter, residues of reagents used in the process of producing the fabric, such as paste, or other contaminants, previous to textile printing. The cleansing agent for the washing out may be a known one, and examples thereof include alkaline agents such as sodium hydroxide, potassium hydroxide, sodium carbonate, and potassium carbonate, surfactants such as anionic surfactants, nonionic surfactants, cationic surfactants, and amphoteric surfactants, and enzymes.

When an ink composition is printed on fabric, it is preferable to discharge the ink composition by a method using an electrostrictive element, such as a piezoelectric element, not to heat the ink composition. When the ink composition is heated as in a case using a thermal head, the polymer fine particles or the cationic polymer fine particles in the pigment-fixing solution and the polymer used for dispersing the pigment in the ink composition are deteriorated to make the discharge unstable. When a large amount of ink is discharged over a long period of time in the process as in production of a printed matter on fabric, a head that causes heating of the ink composition is not preferred.

Ink Composition for Ink Jet Textile Printing

The pretreatment agent for ink jet textile printing, the ink jet textile printing process using it, and the ink composition for ink jet textile printing suitable for obtaining a printed matter on fabric will be described. In the ink composition for ink jet textile printing, the pigment serving as a color material is self-dispersing or is dispersed in an acrylic resin. In particular, in the case of using a black ink, the color-developing property is increased by using superficially-oxidized carbon black that gives a self-dispersing pigment. In the case of using a color ink, the color-developing property and stability are improved by dispersing an organic pigment with an acrylic resin. Here, the acrylic resin is a resin of which main component is a monomer having a (meth)acryloyl group, such as acrylate and methacrylate, and another vinyl monomer such as styrene may be used.

Pigment Dispersion

The average particle diameter of the pigment dispersion is measured by light scattering. If the average particle diameter of the pigment dispersion is smaller than 50 nm, the color-developing property of a printed matter or a printed matter on fabric decreases. On the contrary, an average particle diameter of larger than 1 μm decreases the fixing property. In the cases of black and color pigments, the average particle diameter is more preferably 70 to 230 nm and most preferably 80 to 130 nm. In the case of white pigment, the average particle diameter is preferably 100 to 600 nm and more preferably 200 to 500 nm. If the average particle diameter is smaller than 100 nm, the shielding property decreases to reduce the white color-developing property. An average particle diameter of larger than 1 μm decreases the fixing property and the stability of discharge from an ink jet head.

The pigment dispersion preferably contains self-dispersing carbon black having an average particle diameter of 50 to 300 nm, which can be dispersed in water, without using a dispersing agent. The use of the self-dispersing carbon black improves the color-developing property of a printed matter on fabric. As the method of allowing the particles to be dispersed in water without using a dispersing agent, for example, the surface of the carbon black is oxidized with ozone, sodium hypochlorite, or the like. The average particle diameter of the self-dispersing carbon black dispersion is preferably 50 to 150 nm. When the average particle diameter is smaller than 50 nm, the color-developing property is hardly obtained. On the contrary, an average particle diameter of larger than 150 nm decreases the fixing property. The average particle diameter is more preferably 70 to 130 nm and most preferably 80 to 120 nm.

The pigment dispersion is a dispersion of an organic pigment dispersed in water with a polymer and has an average particle diameter of 50 to 300 nm. The polymer preferably has a styrene-reduced mass-average molecular weight of 10000 to 200000 when determined by gel permeation chromatography (GPC). By doing so, the fixing property of the pigment of a printed matter on fabric is improved, and the storage stability of the pigment ink itself is also improved. That is, the polymer is detached due to the characteristics of a vehicle used in preparation of the ink composition to easily cause a disadvantageous effect. Specifically, an acetylene glycol, acetylene alcohol, or silicone surfactant serving as an additive for improving printing quality, di(tri)ethylene glycol monobutyl ether, dipropylene glycol monobutyl ether, 1,2-alkylene glycol, or a mixture thereof, and the detached polymer easily attack the adhesive used in a head. An average molecular weight of larger than 200000 readily increases the viscosity of the ink and makes acquisition of stable dispersion difficult.

The polymer used for the dispersion can be a polymer of a monomer or an oligomer having an acryloyl group, a methacryloyl group, a vinyl group, or an allyl group containing a double bond therein.

The polymer used for the dispersion preferably has a carboxyl group in order to have hydrophilicity and in order to improve color-developing property by means of aggregation due to the polyvalent metal ion in Embodiment A, the cationic polymer in Embodiment B, or the cationic polymer fine particles in Embodiment C. The carboxyl group can be provided by, for example, acrylic acid, methacrylic acid, crotonic acid, propyl acrylic acid, isopropyl acrylic acid, itaconic acid, or fumaric acid. These may be used alone or in combination thereof. Preferred are acrylic acid and/or methacrylic acid.

The polymer used for the dispersion is preferably a copolymer mainly composed of a carboxyl group-containing monomer and acrylate and/or methacrylate. The mass ratio of acrylic acid/methacrylic acid and acrylate/methacrylate to the total mass of the monomer is preferably 80% or more from the viewpoint of fixing property of the ink on printed fabric.

The polymer used for the dispersion preferably contains benzyl acrylate and/or benzyl methacrylate in an amount of 40% or more and 80% or less of the total mass of the monomer. If the sum of mass of the benzyl group-containing acrylic monomer and methacrylic monomer is less than 40%, the color-developing property of the printed matter on fabric decreases, and if the sum of mass is higher than 80%, dispersion stability is hardly obtained. In the benzyl group-containing water-dispersible polymer, monomers other than benzyl acrylate and benzyl methacrylate are preferably acrylic acid and/or methacrylic acid and other acrylate and/or methacrylate. The other acrylate and/or methacrylate are preferably butyl acrylate and/or butyl methacrylate.

The polymer used for the dispersion is preferably a copolymer of a monomer composition in which the mass ratio of acrylate and acrylic acid to the total mass of monomers is 80% or more. A mass ratio of lower than 80% decreases the fixing property of the ink on printed fabric. Examples of the acrylate include methyl acrylate, ethyl acrylate, propyl acrylate, butyl acrylate, hexyl acrylate, cyclohexyl acrylate, octyl acrylate, lauryl acrylate, 2-ethylhexyl acrylate, 2-ethylhexylcarbitol acrylate, phenol EO-modified acrylate, N-vinylpyrrolidone, isobornyl acrylate, benzyl acrylate, paracumylphenol EO-modified acrylate, and 2-hydroxyethyl-3-phenoxypropyl acrylate, and commercially available acrylates can be used. Preferably, benzyl acrylate and/or butyl acrylate is used. More preferred is a copolymer of a monomer containing benzyl acrylate in 40% or more and 80% or less of the total mass of the monomer.

The polymer used for the dispersion can be obtained by a known method such as solution polymerization or emulsion polymerization. In addition to the polymer used for the dispersion, as a dispersion stabilizer for stably dispersing the pigment dispersion in ink, a water-dispersible or water-soluble polymer or surfactant may be contained. The polymer used for the dispersion is preferably a polymer obtained by copolymerization of structural components containing at least 70% of (meth)acrylate and (meth) acrylic acid, from the viewpoint of dispersion stability.

As the pigments contained in inks according to Embodiments A to C, a particularly preferred pigment for a black ink is carbon black (C.I. Pigment Black 7) such as furnace black, lamp black, acetylene black, or channel black. Metals such as copper oxide, iron oxide (C.I. Pigment Black 11), or titanium oxide and organic pigment such as aniline black (C.I. Pigment Black 1) also can be used.

As color inks contained in inks according to Embodiments A to C, for example, C.I. Pigment Yellow 1 (Fast Yellow G), 3, 12 (disazo yellow AAA), 13, 14, 17, 24, 34, 35, 37, 42 (yellow iron oxide), 53, 55, 74, 81, 83 (disazo yellow HR), 93, 94, 95, 97, 98, 100, 101, 104, 103, 109, 110, 117, 120, 128, 138, 153, 155, 180, and 185; C.I. Pigment Red 1, 2, 3, 5, 17, 22 (brilliant fast scarlet), 23, 31, 38, 48:2 (permanent, red 2B(Ba)), 48:2 (permanent red 2B(Ca)), 48:3 (permanent red 2B(Sr)), 48:4 (permanent red 2B(Mn)), 49:1, 52:2, 53:1, 57:1 (brilliant carmine 6B), 60:1, 63:1, 63:2, 64:1, 81 (rhodamine 6G lake), 83, 88, 101 (iron oxide red), 104, 105, 106, 108 (cadmium red), 112, 114, 122 (quinacridone magenta), 123, 146, 149, 166, 168, 170, 172, 177, 178, 179, 185, 190, 193, 202, 206, 209, and 219; C.I. Pigment Violet 19 and 23; C.I. Pigment Orange 36, 43, and 64; C.I. Pigment Blue 1, 2, 15 (phthalocyanine blue R), 15:1, 15:2, 15:3 (phthalocyanine blue G), 15:4, 15:6 (phthalocyanine blue E), 16, 17:1, 56, 60, and 63; and C.I. Pigment Green 1, 4, 7, 8, 10, 17, 18, and 36 can be used. Thus, various pigments can be used as the color materials.

The pigment is dispersed using a disperser. The disperser may be a commercially available one and is preferably a medialess disperser from the viewpoint of low contamination, and examples thereof include a wet jet mill (Genus), nanomizer (Nanomizer), homogenizer (Gorin), altemizer (Sugino Machine), and microfluidizer (Microfluidics).

The content of the pigment is preferably 0.5 to 30% and more preferably 1.0 to 15%. A content of 0.5% or less cannot ensure a printing density, and a content of 30% or more increases the viscosity of ink and causes structural viscosity in viscous characteristics, resulting in a tendency to deteriorate the discharge stability of ink from an ink jet head.

Polymer Fine Particles Contained in Ink

The printed matters on fabric formed by the textile printing process using the pretreatment agents for ink jet textile printing according to Embodiments A to C preferably contain polymer fine particles. In order to distinguish the polymer fine particles herein from the polymer fine particles or cationic polymer fine particles of the pretreatment agents, the polymer fine particles herein are expressed as "polymer fine particles contained in ink" hereinafter. The polymer fine particles contained in ink is used for improving the fixing property of the ink to fabric. The polymer fine particles contained in ink preferably has a glass transition temperature of $-10°$ C. or less, which improves the fixing property of the pigment of printed fabric. If the glass transition temperature is higher than $-10°$ C., the fixing property of the pigment gradually decreases. The glass transition temperature is preferably $-15°$ C. or less and more preferably $-20°$ C. or less.

In Embodiments A and B, the polymer fine particles contained in ink preferably have an acid number of 30 mg KOH/g or more and 100 mg KOH/g or less. An acid number of larger than 100 mg KOH/g decreases the washing fastness of a printed matter on fabric. An acid number of smaller than 30 mg KOH/g decreases the stability of the ink to decrease the color-developing property and fixing property on fabric. The acid number is preferably 40 mg KOH/g or more and 80 mg KOH/g or less.

The polymer fine particles contained in ink preferably have a styrene-reduced mass-average molecular weight of 100000 or more and 1000000 or less when determined by gel permeation chromatography (GPC). Within this range, the fixing property of the pigment of printed fabric is improved. The average particle diameter of the polymer fine particles contained in ink is determined by light scattering. The polymer fine particles contained in ink preferably have a particle diameter of 50 nm or more and 500 nm or less, more preferably 60 nm or more and 300 nm or less, when determined by light scattering. A particle diameter of smaller than 50 nm decreases the fixing property of a printed matter on fabric, and a particle diameter of larger than 500 nm decreases the dispersion stability. Furthermore, when a pigment fixing solution is ink jet printed, the discharge of the solution from an ink jet head tends to be unstable.

The polymer fine particles contained in ink contains alkyl (meth)acrylate and/or cyclic alkyl (meth)acrylate as a structural component. The alkyl (meth)acrylate and/or cyclic alkyl (meth)acrylate are preferably alkyl (meth)acrylate having 1 to 24 carbon atoms and/or cyclic alkyl (meth)acrylate having 3 to 24 carbon atoms, and examples thereof include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethyl hexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate. The content of the alkyl (meth)acrylate and/or cyclic alkyl (meth)acrylate is preferably 70% or more of the total amount of the polymer fine particles contained in ink. Within this range, the rubbing fastness in both dry and wet rubbing and the dry-cleaning resistance of a printed matter on fabric are further improved.

The acid contained in the polymer fine particles contained in ink as a structural component preferably has a carboxyl group from the view point of reactivity with the polyvalent metal ion in the pretreatment agent A, the cationic polymer in the pretreatment agent B, and the cationic polymer fine particles in the pretreatment agent C. Examples of the acid having a carboxyl group include unsaturated carboxylic acid such as acrylic acid, methacrylic acid, or maleic acid.

1,2-Alkylene Glycol

The inks according to Embodiments A to C preferably contain 1,2-alkylene glycol. The use of 1,2-alkylene glycol reduces bleeding of a printed matter or a printed matter on fabric to improve printing quality. The 1,2-alkylene glycol is preferably 1,2-alkylene glycol having five or six carbon atoms, such as 1,2-hexanediol, 1,2-pentanediol, and 4-methyl-1,2-pentanediol. Among them, preferred are 1,2-hexanediol and 4-methyl-1,2-pentanediol having six carbon atoms. The content of the 1,2-alkylene glycol is preferably 0.3 to 30%, more preferably 0.5 to 10%.

Glycol Ether

The inks according to Embodiments A to C preferably contain glycol ether. The use of glycol ether reduces bleeding of a printed matter or a printed matter on fabric. The glycol ether is preferably one or more selected from diethylene glycol monobutyl ether, triethylene glycol monobutyl ether, propylene glycol monobutyl ether, and dipropylene glycol monobutyl ether. The content of the glycol ether is preferably 0.1 to 20%, more preferably 0.5 to 10%.

Acetylene Glycol Surfactant and/or Acetylene Alcohol Surfactant

The inks according to Embodiments A to C preferably contain an acetylene glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from. 2,4,7,9-tetramethyl-5-decine-4,7-diol, alkylene oxide adducts of 2,4,7,9-tetramethyl-5-decine-4,7-diol, 2,4-dimethyl-5-decin-4-ol, and alkylene oxide adducts of 2,4-dimethyl-5-decin-4-ol. These are available, for example, from Air Products (GE) as Olfine (registered trademark) 104 series and E series, such as Olfine E1010, or from Nissin Chemical industry as Surfynol (registered trademark) 465 and Surfynol 61.

In the embodiment, bleeding is further reduced by using one or more selected from the group consisting of the 1,2-alkylene glycol, the acetylene glycol surfactant and/or the acetylene alcohol surfactant, and the glycol ether.

The ink according to the above-described Embodiments may further contain a multifunctional compound. The multifunctional compound further improves the rubbing fastness in both dry and wet rubbing and the dry-cleaning resistance of a printed matter on fabric. The multifunctional compound will be described below as a component of a pigment fixing solution.

In the ink set according to Embodiment C, the (total) content (% by mass) of the cationic polymer fine particles and/or the multifunctional compound contained in ink and/or a pigment fixing solution is higher than the content (% by mass) of the pigment contained in the ink. This improves the fixing property of the pigment of printed fabric.

Other Components

In order to ensure storage stability and stable discharge from an ink jet head and in order to prevent clogging and degradation of ink, the ink according to the embodiment can appropriately contain various additives such as a moisturizing agent, a solubilizing agent, a penetration controlling agent, a viscosity adjuster, a pH adjuster, an antioxidant, an antiseptic agent, an anti-mold agent, and a chelate for capturing metal ions that affect dispersion.

The ink according to the embodiment may contain a water-soluble organic solvent, in addition to the above-described components, according to need. Examples of the water-soluble organic solvent include polyols (e.g., ethylene glycol, glycerin, 2-ethyl-2-(hydroxymethyl)-1,3-propanediol, tetraethylene glycol, triethylene glycol, tripropylene glycol, 1,2,4-butane triol, diethylene glycol, propylene glycol, dipropylene glycol, butylene glycol, 1,4-butanediol, 1,2-butanediol, 1,5-pentanediol, 1,6 hexanediol, 1,8-octanediol, 1,2-octanediol, 2,2-dimethyl-1,3-propanediol, 2-methyl-2,4-pentanediol, 3-methyl-1,5-pentanedial, 3-methyl-1,3-butanediol, 2-methyl-1,3-propanediol, and 2-butyl-2-ethyl-1,3-propanediol), amines (e.g., monoethanolamine, diethanolamine, triethanolamine, and 2-(dimethylamino)ethanol), monohydric alcohols (e.g., methanol, ethanol, propanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'-thiodiethanol, amides (e.g., N,N-dimethylformamide), heterocycles (e.g., 2-pyrrolidone), and acetonitrile. The content of the water-soluble organic solvent is preferably 1 to 60% by mass of the total mass of ink.

The ink according to the embodiment can contain a surfactant, in addition to the above-described components, according to need. The surfactant may be any of anionic, cationic, amphoteric, and nonionic surfactants.

Examples of the anionic surfactant include aliphatic amines, aliphatic quaternary ammonium salts, bezalkonium salts, benzethonium chloride, pyridinium salts, and imidazolinium salts. Examples of the cationic surfactant include fatty acid soap, N-acyl-N-methylglycine salts, N-acyl-N-methyl-β-alanine salts, N-acylglutamate, alkyl ether carboxylates, acylated peptides, alkyl sulfonates, alkylbenzene sulfonates, alkylnaphthalene sulfonates, dialkyl sulfosuccinates, alkyl sulfoacetates, α-olefine sulfonate, N-acylmethyl taurine, sulfated oil, higher alcohol sulfates, secondary higher alcohol sulfates, alkyl sulfates, secondary higher alcohol ethoxysulfates, polyoxyethylene alkyl phenyl ether sulfates, monoglysulfate, fatty acid alkylolamide sulfates, alkyl ether phosphates, and alkyl phosphates. Examples of the amphoteric surfactant include carboxybetaine-type surfactants, sulfobetaine-type surfactants, aminocarboxylates, and imidazolinium betaine. Examples of the nonionic surfactant include polyoxyethylene alkyl phenylethers (e.g., Emalgen 911, a product of Kao Corp.), polyoxyethylene sterol ethers, polyoxyethylene alkyl ethers, polyoxyethylene secondary alcohol ethers, polyoxyethylene lanolin derivatives, polyoxyethylene polyoxypropylene alkyl ethers (e.g., Newpol PE-62, a product of Sanyo Chemical Industries, Ltd.), polyoxyethylene glycerin fatty acid esters, polyoxyethylene sorbitan fatty acid esters, polyoxyethylene sorbitol fatty acid esters, polyethylene glycol fatty acid esters, fatty acid monoglycerides, polyglycerin fatty acid esters, sorbitan fatty acid esters, polyoxyethylene castor oil, hydrogenated castor oil, propylene glycol fatty acid esters, sucrose fatty acid esters, fatty acid alkanolamides, polyoxyethylene fatty acid amides, polyoxyethylene alkylamines, and alkyl amine oxides.

These surfactants may be used alone or in combination thereof, and an amount within the range of 0.001 to 1.0% by mass of the total mass of ink can arbitrarily adjust the surface tension of the ink and is therefore preferred.

The average particle diameters of the polymer fine particles, the cationic polymer fine particles, and the pigment can be determined with a commercially available particle size meter based on light scattering. Specific examples of the particle size meter include ELS series (products of Otsuka Denshi Co., Ltd.), Microtrac series and Nanotrac series (Nikkiso Co., Ltd.), and Zeta Sizer series (Malvern Instruments Ltd.).

Printed Matter on Fabric

The printed matters on fabric according to Embodiments A to C are obtained by the above-described textile printing process.

The invention will be specifically described with reference to examples, but the invention is not limited to these examples and can be variously modified within the scope of the invention. Note that the terms "part(s)" and "%" used in the examples represent "part(s) by mass" and "% by mass", respectively, unless otherwise stated.

EXAMPLE A

Example A1

Preparation of Pretreatment Agent A1
(1) Production of Polymer Fine Particles 1

Ion-exchanged water (100 parts) was placed in a reaction container equipped with a dropping device, a thermometer, a water-cooled reflux condenser, and a stirrer. Potassium persulfate (0.2 parts) serving as a polymerization initiator was added to the reaction container at 70° C. with stirring under a nitrogen atmosphere. A monomer solution composed of is water (7 parts), sodium lauryl sulfate (0.05 parts), glycidoxy acrylate (4 parts), ethyl acrylate (15 parts), butyl acrylate (15 parts), tetrahydrofurfuryl acrylate (6 parts), butyl methacrylate (5 parts), and t-dodecyl mercaptan (0.02 parts) was dropwise added to the reaction container at 70° C. to prepare a primary material. To the primary material, 10% ammonium persulfate solution (2 parts) was added, followed by stirring. Furthermore, to the resulting mixture, a reaction solution composed of ion-exchanged water (30 parts), potassium lauryl sulfate (0.2 parts), ethyl acrylate (30 parts), methyl acrylate (25 parts), butyl acrylate (6 parts), vinyl sulfonic acid (6 parts), and t-dodecyl mercaptan (0.5 parts) was added at 70° C. with stirring for polymerization. After neutralization with sodium hydroxide to a pH of 8 to 8.5, a water dispersion of polymer fine particles was prepared by filtration through a 0.3 μm filter. The concentration of the dispersion was adjusted with water to obtain an emulsion a (EM-a) having a solid content of 40%. A portion of this water dispersion of the polymer fine particles was dried, and the glass transition temperature thereof was measured with a differential scanning calorimetry (Exstar 6000 DSC, a product of Seiko Instruments Inc.) to be −15° C. The styrene-reduced molecular weight measured with an L7100 system (a product of Hitachi, Ltd.) by gel permeation chromatography (GPC) using THF as a solvent was 150000. The acid number determined by titration was 21 mg KOH/g. The particle diameter measured with a Microtrac particle size distribution analyzer UPA250 (Nikkiso Co., Ltd.) was 160 nm.

(2) Production of Pretreatment Agent A1

The following additives were sequentially mixed, stirred, and filtered through 5 μm filter to prepare pretreatment agent A1:

EM-a (solid content: 40%): 25.0%,
calcium chloride: 10.5%,
Olfine E1010 (acetylene glycol surfactant, a product of Nissin Chemical Industry Co., Ltd.): 1.2%,
Proxel XLII (a product of Arch Chemicals Japan, Inc.): 0.3%,
1,2-hexanediol: 0.5%,
triethylene glycol: 0.5%, and
ion-exchanged water: balance.

Preparation of Black Ink 1, Cyan Ink 1, Magenta Ink 1, Yellow Ink 1, and White Ink 1 for Ink Jet Recording (1) Production of Pigment Dispersion Bk1 for Black Ink Monarch 880 (a product of Cabot Corp. U.S.A.), carbon black (C.I. Pigment Black 7), was used as pigment dispersion 1. The surface of the carbon black was oxidized by the same method as that described in JP-A-8-3498 to impart dispersibility in water to the carbon black. The pigment solid content was adjusted to 15% with ion-exchanged water to give pigment dispersion Bk1 for black ink.

(2) Production of Pigment Dispersion C1 for Cyan Ink

C.I. Pigment Blue 15:4 (copper phthalocyanine pigment: a product of Clariant) was used as dispersion 1 for cyan ink. A reaction container equipped with a stirrer, a thermometer, a reflux tube, and a dropping funnel was replaced with nitrogen, and benzyl acrylate (75 parts), acrylic acid (2 parts), and t-dodecyl mercaptan (0.3 parts) were placed in the reaction container and were then heated to 70° C. Benzyl acrylate (150 parts), acrylic acid (15 parts), butyl acrylate (5 parts), t-dodecyl mercaptan (1 part), methyl ethyl ketone (20 parts), and sodium persulfate (1 part) were placed in the dropping funnel and dropped to the reaction container over 4 hours for polymerization to produce a polymer dispersion. Subsequently, methyl ethyl ketone was added to the reaction container to prepare a polymer solution A dispersing 40% of pigment. A portion of this polymer solution was dried, and the glass transition temperature thereof was measured with a differential scanning calorimetry (Exstar 6000 DSC, a product of Seiko Instruments Inc.) to be 40° C.

The pigment-dispersing polymer solution A (40 parts), C.I. Pigment Blue 15:4 (copper phthalocyanine pigment, a product of Clariant, 30 parts), 0.1 mol/L aqueous solution of sodium hydroxide (100 parts), and methyl ethyl ketone (30 parts) were mixed. The mixture was dispersed at 200 MPa with 15 passes using a ultra-high pressure homogenizer (Altimizer-HJP-25005, a product of Sugino Machine Ltd.). The dispersion was transferred to another container, and ion-exchanged water (300 parts) was added thereto, followed by stirring for 1 hour. The entire methyl ethyl ketone and part of water were distilled away with a rotary evaporator, followed by neutralization with 0.1 mol/L sodium hydroxide to adjust the pH to 9. The resulting pigment solution was filtered through a 3 μm membrane filter, and the pigment solid content was adjusted to 15% with ion-exchanged water to give pigment dispersion C1 for cyan ink.

(3) Production of Pigment Dispersion M1 for Magenta Ink

Pigment dispersion M1 was produced as in pigment dispersion C1 except that C.I. Pigment Red 122 (quinacridone pigment, a product of Clariant) was used.

(4) Production of Pigment Dispersion Y1 for Yellow Ink

Pigment dispersion Y1 was produced as in pigment dispersion C1 except that C.I. Pigment Yellow 180 (benzimidazolone pigment, a product of Clariant) was used.

(5) Production of Pigment Dispersion W1 for White Ink

Pigment dispersion W1 was produced as in pigment dispersion C1 except that C.I. Pigment White 6 (rutile rutile-type titanium oxide pigment ST410WB, a product of Titan. Kogyo, Ltd.) was used and that the content of DISPERBYK-2015 (a product of BYK-Chemie Japan) serving as a dispersing agent was adjusted to 12% of the mass of the pigment.

(6) Production of Polymer Fine Particles Contained in Ink

Ion-exchanged water (100 parts) was placed in a reaction container equipped with a dropping device, a thermometer, a water-cooled reflux condenser, and a stirrer. Potassium persulfate (0.2 parts) serving as a polymerization initiator was added to the reaction container at 70° C. with stirring under a nitrogen atmosphere. A monomer solution composed of ion-exchanged water (7 parts), sodium lauryl sulfate (0.05 parts), glycidoxy acrylate (4 parts), ethyl acrylate (15 parts), butyl acrylate (15 parts), tetrahydrofurfuryl acrylate (6 parts), butyl methacrylate (5 parts), and t-dodecyl mercaptan (0.02 parts) was dropwise added to the reaction container at 70° C. to prepare a primary material. To the primary material, 10% ammonium persulfate solution (2 parts) was added, followed by stirring. Furthermore, to the resulting mixture, a reaction solution composed of ion-exchanged water (30 parts), potassium lauryl sulfate (0.2 parts), ethyl acrylate (30 parts), methyl acrylate (25 parts), butyl acrylate (6 parts), acrylic acid (5 part), and t-dodecyl mercaptan (0.5 parts) was added at 70° C. with stirring for polymerization. After neutralization with sodium hydroxide to a pH of 8 to 8.5, a water dispersion of polymer fine particles was prepared by filtration through a 0.3 μm filter. The concentration of the dispersion was adjusted with water to obtain an emulsion A1 (EM-A1) having a solid content of 40%. A portion of the water dispersion of the polymer fine particles was dried, and the glass transition temperature thereof was measured with a differential scanning calorimetry (Exstar 6000 DSC, a product of Seiko Instruments Inc.) to be −15° C. The styrene-reduced molecular weight measured with an L7100 system (a product of Hitachi, Ltd.) by gel permeation chromatography (GPC) using THF as a solvent was 150000. The acid number determined by titration was 20 mg KOH/g.

(7) Preparation of Ink for Ink Jet Recording

Examples of compositions suitable for ink for ink jet recording are shown below.

Black Ink 1
dispersion Bk1 (pigment solid content: 15%): 32.0%
EM-A1 (solid content: 40%): 12.5%
triethylene glycol monobutyl ether: 2.0%
1,2-hexanediol: 1.0%
trimethylol propane: 3.0%
glycerin: 11.0%
triethylene glycol: 1.5%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%

Proxel XLII (a product of Arch Chemicals Japan, Inc.): 0.3%
1,2-hexanediol: 0.5%
water: balance
Cyan Ink 1
dispersion C1 (pigment solid content: 15%): 24.0%
EM-A1 (solid content: 40%): 12.5%
triethylene glycol monobutyl ether: 2.0%
1,2-hexanediol: 1.0%
trimethylol propane: 4.0%
glycerin: 12.0%
triethylene glycol: 2.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch Chemicals Japan, Inc.): 0.3%
1,2-hexanediol: 0.5%
ion-exchanged water: balance
Magenta Ink 1
dispersion M1 (pigment solid content: 15%): 32.0%
EM-A1 (solid content: 40%): 12.5%
triethylene glycol monobutyl ether: 2.0%
1,2-hexanediol: 1.0%
trimethylol propane: 3.5%
glycerin: 11.0%
triethylene glycol: 2.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch Chemicals Japan, Inc.): 0.3%
1,2-hexanediol: 0.5%
water: balance
Yellow Ink 1
dispersion Y1 (pigment solid content: 15%): 32.0%
EM-A1 (solid content: 40%): 12.5%
triethylene glycol monobutyl ether: 2.0%
1,2-hexanediol: 1.0%
trimethylol propane: 3.5%
glycerin: 11.0%
triethylene glycol: 2.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch. Chemicals Japan, Inc.): 0.3%
1,2-hexanediol: 0.5%
water: balance
White Ink 1
dispersion W1 (pigment solid content: 15%): 50.0%
EM-A1 (solid content: 40%): 12.5%
triethylene glycol monobutyl ether: 2.0%
1,2-hexanediol: 1.0%
trimethylol propane: 1.5%
glycerin: 8.0%
triethylene glycol: 1.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.3%
Proxel XLII (a product of Arch Chemicals Japan, Inc.): 0.3%
1,2-hexanediol: 0.5%
water: balance Note that all water used as the balance in Examples and Comparative Examples was ion-exchanged water containing 0.05% of Topside 240 (a product of Permachem Asia, Ltd.) for preventing corrosion of ink, 0.02% of benzotriazole for preventing corrosion of ink jet head members, and 0.04% of ethylene diamine tetraacetic acid (EDTA) disodium salt for reducing influence of metal ions in an ink system.

Production of Printed Fabric Sample A1

Pretreatment agent A1 was applied to cotton fabric with PX-A650 by an ink jet process. Subsequently, textile printing was conducted with PX-A650 by an ink jet process using the black ink 1, cyan ink 1, magenta ink 1, yellow ink 1, and white ink 1 for ink jet printing, followed by drying at 160° C. for 5 minutes to produce printed matter 1 on the fabric. The black ink 1, cyan ink 1, magenta ink 1, and yellow ink 1 were each set to the corresponding line of the head of PX-A650, but the white ink 1 was set to three lines of cyan, magenta, and yellow of the head of another PX-A650 and was used for textile printing on the fabric at areas where no color was printed to produce printed fabric sample A1.

(1) Abrasion Resistance Test and Dry-cleaning Test

The printed fabric sample A1 was rubbed 200 times under a load of 300 g with a Gakushin-type rubbing fastness tester AB-301S, a product of Tester Sangyo Co., Ltd., for evaluating rubbing fastness. The degree of detachment of the ink was evaluated in accordance with Japanese Industrial Standard (JIS) L0849 under two levels: dry and wet. Examples were determined as grade 4 or above.

Similarly, the dry-cleaning test was conducted in accordance with Method B of JIS L0860 for evaluation. Table 1 shows the results of the abrasion resistance test and the dry-cleaning test. Examples were determined as grade 4 or above.

(2) Measurement of Color-developing Property

The color-developing property of the printed fabric sample A1 was evaluated with GRETAG SPECTROSCAN SPM-50. As indicators, the black ink was evaluated for OD; the cyan, magenta, and yellow inks were evaluated for saturation; and the white ink was evaluated for degree of whiteness. Table 1 shows the results. Examples were determined that the OD value was 1.1 or more, the saturation of each of the cyan and magenta inks was 40 or more, the saturation of the yellow ink was 50 or more, and the degree of whiteness was 70 or more.

Example A2

Preparation of Pretreatment Agent A2

(1) Production of Pretreatment Agent A2

Pretreatment agent A2 was prepared as in the preparation of pretreatment agent A1 except that magnesium chloride was used as the multivalent metal salt instead of calcium chloride.

Preparation of Black Ink 2, Cyan Ink 2, Magenta Ink 2, and Yellow Ink 2 for Ink Jet Recording (1) Production of Pigment Dispersion Bk2 for Black Ink Pigment dispersion Bk2 for black ink was produced as in the pigment dispersion for black ink in Example A1 except that MA100, a product of Mitsubishi Chemical Corp., was used instead of Monarch 880, a product of Cabot Corp. U.S.A., carbon black (C.I. Pigment Black 7).

(2) Production of Pigment Dispersion C2 for Cyan Ink

Pigment dispersion C2 for cyan ink was produced as in Example A1 except that C.I. Pigment Blue 15:3 (copper phthalocyanine pigment, a product of Clariant) was used instead of C.I. Pigment Blue 15:4 (copper phthalocyanine pigment, a product of Clariant).

(3) Production of Pigment Dispersion M2 for Magenta Ink

Pigment dispersion M2 for magenta ink was produced as in Example A1 except that C.I. Pigment violet 19 (quinacridone pigment, a product of Clariant) was used instead of C.I. Pigment Red 122 (quinacridone pigment, a product of Clariant).

(4) Production of Pigment Dispersion Y2 for Yellow Ink

Pigment dispersion Y2 for yellow ink was produced as in Example A1 except that C.I. Pigment Yellow 185 (isoindoline pigment, a product of BASF) was used instead of C.I. Pigment Yellow 180 (benzimidazolone pigment, a product of Clariant).

(5) Production of Pigment Dispersion W2 for White Ink

Pigment dispersion W2 for white ink was produced as in Example A1 except that C.I. Pigment White 6 (rutile-type titanium oxide pigment CR-EL, a product of Ishihara Sangyo Kaisha, Ltd.) was used and that the content of DISPERBYK-190 (a product of BYK-Chemie Japan) serving as a dispersing agent was adjusted to 12% of the mass of the pigment.

(6) Preparation of Ink for Ink Jet Recording

Examples of compositions suitable for ink jet recording are shown below.

Black Ink 2
dispersion Bk2 (pigment solid content: 15%): 32.0%
EM-A1 (solid content: 40%): 12.5%
triethylene glycol monobutyl ether: 2.0%
1,2-hexanediol: 1.0%
trimethylol propane: 3.0%
glycerin: 11.0%
triethylene glycol: 1.5%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch Chemicals Japan, Inc.): 0.3%
1,2-hexanediol: 0.5%
water: balance Cyan Ink 2
dispersion C2 (pigment solid content: 15%): 24.0%
EM-A1 (solid content: 40%): 12.5%
triethylene glycol monobutyl ether: 2.0%
1,2-hexanediol: 1.0%
trimethylol propane: 4.0%
glycerin: 12.0%
triethylene glycol: 2.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch Chemicals Japan, Inc.): 0.3%
1,2-hexanediol: 0.5%
ion-exchanged water: balance Magenta Ink 2
dispersion M2 (pigment solid content: 15%): 32.0%
EM-A1 (solid content: 40%): 12.5%
triethylene glycol monobutyl ether: 2.0%
1,2-hexanediol: 1.0%
trimethylol propane: 3.5%
glycerin: 11.0%
triethylene glycol: 2.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch Chemicals Japan, Inc.): 0.3%
1,2-hexanediol: 0.5%
water: balance Yellow Ink 2
dispersion Y2 (pigment solid content: 15%): 32.0%
EM-A1 (solid content: 40%): 12.5%
triethylene glycol monobutyl ether: 2.0%
1,2-hexanediol: 1.0%
trimethylol propane: 3.5%
glycerin: 11.0%
triethylene glycol: 2.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch Chemicals Japan, Inc.): 0.3%
1,2-hexanediol: 0.5%
water: balance White Ink 2
dispersion W2 (pigment solid content: 15%): 50.0%
EM-A1 (solid content: 40%): 12.5%
triethylene glycol monobutyl ether: 2.0%
1,2-hexanediol: 1.0%
trimethylol propane: 1.5%
glycerin: 8.0%
triethylene glycol: 1.0%
Surfynol 104 (acetylene glycol surfactant, a product of Nissin Chemical Industry Co., Ltd.): 0.1%
Olfine E1010 (acetylene glycol surfactant, a product of Nissin Chemical Industry Co., Ltd.): 0.8%
Proxel XLII (a product of Arch Chemicals Japan, Inc.): 0.3%
1,2-hexanediol: 0.5%
water: balance Production of Printed Fabric Sample A2

Printed fabric sample A2 was produced as in printed fabric sample A1 of Example A1 except that pretreatment agent A2 was used.

(1) Abrasion Resistance Test and Dry-cleaning Test

Printed fabric sample A2 was evaluated as in Example A1. The results of the abrasion resistance test and the dry-cleaning test are shown in Table 1.

(2) Measurement of Color-developing Property

Printed fabric sample A2 was evaluated as in Example A1. The results are shown in Table 1.

Examples A3 to A7

Polymer fine particles having a particle diameter of 50 nm (Example A3), 300 nm (Example A4), 500 nm (Example A5), 1 μm (Example A6), or 5 μm (Example A7) were produced as in Example A1 by adjusting the stirring speed by a known method. Printed fabric samples A3-1 to A3-5 were produced as in Example A1 except that emulsions b1 to b5 (EM-b1 to EM-b5) having a solid content of 40%, aqueous solutions of the polymer fine particles, were used for the pretreatment agents A3-1 to A3-5. Note, however, that since, in Example A7, application by ink jet recording could not be achieved, application was performed by padding. The printed fabric samples A3-1 to A3-5 were subjected to the abrasion resistance test, dry-cleaning test, and measurement of color-developing property as in Example A1. The results are shown in Table 1.

Examples A8 to A12

Polymer fine particles having a glass transition temperature of −30° C. (Example A8), −25° C. (Example A9), −20° C. (Example A10), −13° C. (Example A11), or −10° C. (Example A12) were produced by a known method as in Example A1 except that lauryl acrylate was used instead of ethyl acrylate (30 parts), and printed fabric samples A4-1 to A4-5 were produced as in Example A1 except that emulsions c1 to c5 (EM-c1 to EM-c5 having a solid content of 40%, aqueous solutions of the polymer fine particles, were used for the pretreatment agents A4-1 to A4-5. The printed fabric samples A4-1 to A4-5 were subjected to the abrasion resistance test, dry-cleaning test, and measurement of color-developing property as in Example A1. The results are shown in Table 2.

Examples A13 TO A17

Polymer fine particles having a molecular weight of 300000 (Example A13), 200000 (Example A14), 180000 (Example A15), 130000 (Example A16), or 100000 (Example A17) were produced as in Example A1 by adjusting the amount of the polymerization initiator by a known method. Printed fabric samples A5-1 to A5-5 were produced as in Example A1 except that emulsions d1 to d5 (EM-d1 to EM-d5) having a solid content of 40%, aqueous solutions of the polymer fine particles, were used for the pretreatment agents A5-1 to A5-5. The printed fabric samples A5-1 to A5-5 were subjected to the abrasion resistance test, dry-cleaning test, and measurement of color-developing property as in Example A1. The results are shown in Table 3.

Example A18

Printed matters were formed on fabric of hemp (printed fabric sample A6), rayon fiber (printed fabric sample A7), acetate fiber (printed fabric sample A8), silk (printed fabric sample A9), nylon fiber (printed fabric sample A10), and polyester fiber (printed fabric sample A11), instead of cotton in Example A1. The printed fabric samples A6 to A11 were subjected to the abrasion resistance test, dry-cleaning test, and measurement of color-developing property as in Example A1. The results are shown in Table 4.

Comparative Example A1

Printed fabric sample A12 was produced as in Example A1 except that pretreatment agent A6 not containing calcium chloride, unlike pretreatment agent A1 in Example A1, was used. The printed fabric sample A12 was subjected to the abrasion resistance test, dry-cleaning test, and measurement of color-developing property as in Example A1. The results are shown in Table 5.

Comparative Example A2

Polymer fine particles having a glass transition temperature of 15° C. were produced as in Example A1 by using styrene (30 parts) instead of ethyl acrylate (30 parts) by a known method. Printed fabric sample A13 was produced as in Example A1 except that emulsion e (EM-e) having a solid content of 40%, an aqueous solution of the polymer fine particles, was used for pretreatment agent A7. The printed fabric sample A13 was subjected to the abrasion resistance test, dry-cleaning test, and measurement of color-developing property as in Example A1. The results are shown in Table 5.

Comparative Example A3

Polymer fine particles having an acid number of 63 were produced as in Example A1 by a known method except that vinyl sulfonic acid (18 parts) was used instead of vinyl sulfonic acid (6 parts). Printed fabric sample A14 was produced as in Example A1 except that emulsion f (EM-f) having a solid content of 40%, an aqueous solution of the polymer fine particles, was used for pretreatment agent A8. The printed fabric sample A14 was subjected to the abrasion resistance test, dry-cleaning test, and measurement of color-developing property as in Example A1. The results are shown in Table 5.

Comparative Example A4

Polymer fine particles having a particle diameter of 6 μm were produced as in Example A1 by adjusting stirring speed by a known method. Printed fabric sample A14 was produced as in Example A1 except that pretreatment agent A9 prepared by using emulsion g (EM-g) having a solid content of 40%, an aqueous solution of the polymer fine particles, was used without performing filtration with a filter and that since application by ink jet recording could not be achieved, application was performed by padding. The printed fabric sample A15 was subjected to the abrasion resistance test, dry-cleaning test, and measurement of color-developing property as in Example A1. The results are shown in Table 5.

Comparative Example A5

Polymer fine particles having a particle diameter of 30 nm were produced as in Example A1 by adjusting stirring speed by a known method. Printed fabric sample A16 was produced as in Example A1 except that emulsion h (EM-h) having a solid content of 40%, an aqueous solution of the polymer fine particles, was used for pretreatment agent A10. The printed fabric sample A16 was subjected to the abrasion resistance test, dry-cleaning test, and measurement of color-developing property as in Example A1. The results are shown in Table 5.

TABLE 1

Results of abrasion resistance test, dry-cleaning test, and color-developing property in Examples A1 to A7

| Pretreatment agent | | Ink | Abrasion resistance test Dry | Wet | Dry-cleaning test | Color-developing property Saturation | OD | Degree of whiteness |
|---|---|---|---|---|---|---|---|---|
| Example A1 | Pretreatment agent A1 (Printed fabric sample A1) | Bk1 | 4.0 | 4.0 | 5.0 | — | 1.22 | — |
| | | C1 | 4.0 | 4.0 | 5.0 | 43 | — | — |
| | | M1 | 4.5 | 4.5 | 5.0 | 45 | — | — |
| | | Y1 | 5.0 | 5.0 | 5.0 | 55 | — | — |
| | | W1 | 4.5 | 4.5 | 5.0 | — | — | 78 |
| Example A2 | Pretreatment agent A2 (Printed fabric sample A2) | Bk2 | 4.0 | 4.0 | 4.0 | — | 1.21 | — |
| | | C2 | 4.0 | 4.0 | 4.0 | 42 | — | — |
| | | M2 | 4.5 | 4.5 | 4.5 | 43 | — | — |
| | | Y2 | 5.0 | 5.0 | 4.5 | 53 | — | — |
| | | W2 | 4.5 | 4.5 | 4.5 | — | — | 78 |
| Example A3 | Pretreatment agent A3-1 (Printed fabric sample A3-1) | Bk1 | 4.0 | 4.0 | 5.0 | — | 1.18 | — |
| | | C1 | 4.0 | 4.0 | 5.0 | 41 | — | — |
| | | M1 | 4.0 | 4.0 | 5.0 | 43 | — | — |
| | | Y1 | 4.5 | 4.5 | 5.0 | 52 | — | — |
| | | W1 | 4.5 | 4.5 | 5.0 | — | — | 70 |
| Example A4 | Pretreatment agent A3-2 (Printed fabric sample A3-2) | Bk1 | 4.0 | 4.0 | 5.0 | — | 1.23 | — |
| | | C1 | 4.0 | 4.0 | 5.0 | 43 | — | — |
| | | M1 | 4.5 | 4.5 | 5.0 | 45 | — | — |
| | | Y1 | 5.0 | 5.0 | 5.0 | 55 | — | — |
| | | W1 | 4.5 | 4.5 | 5.0 | — | — | 79 |
| Example A5 | Pretreatment agent A3-3 (Printed fabric sample A3-3) | Bk1 | 4.0 | 4.0 | 5.0 | — | 1.22 | — |
| | | C1 | 4.5 | 4.5 | 5.0 | 44 | — | — |
| | | M1 | 4.5 | 4.5 | 5.0 | 46 | — | — |
| | | Y1 | 5.0 | 5.0 | 5.0 | 56 | — | — |
| | | W1 | 4.5 | 4.5 | 5.0 | — | — | 79 |
| Example A6 | Pretreatment agent A3-4 (Printed fabric sample A3-4) | Bk1 | 4.0 | 4.0 | 4.5 | — | 1.22 | — |
| | | C1 | 4.0 | 4.0 | 4.5 | 44 | — | — |
| | | M1 | 4.5 | 4.5 | 4.5 | 46 | — | — |
| | | Y1 | 5.0 | 5.0 | 4.5 | 56 | — | — |
| | | W1 | 4.5 | 4.5 | 4.5 | — | — | 79 |
| Example A7 | Pretreatment agent A3-5 (Printed fabric sample A3-5) | Bk1 | 4.0 | 4.0 | 4.0 | — | 1.21 | — |
| | | C1 | 4.0 | 4.0 | 4.0 | 44 | — | — |
| | | M1 | 4.0 | 4.0 | 4.0 | 47 | — | — |
| | | Y1 | 4.5 | 4.5 | 4.0 | 57 | — | — |
| | | W1 | 4.0 | 4.0 | 4.0 | — | — | 80 |

TABLE 2

Results of abrasion resistance test, dry-cleaning test, and color-developing property in Examples A8 to A12

| Pretreatment agent | | Ink | Abrasion resistance test Dry | Wet | Dry-cleaning test | Color-developing property Saturation | OD | Degree of Whiteness |
|---|---|---|---|---|---|---|---|---|
| Example A8 | Pretreatment agent A4-1 (Printed fabric sample A4-1) | Bk1 | 4.5 | 4.5 | 5.0 | — | 1.21 | — |
| | | C1 | 4.5 | 4.5 | 5.0 | 42 | — | — |
| | | M1 | 5.0 | 5.0 | 5.0 | 44 | — | — |
| | | Y1 | 5.0 | 5.0 | 5.0 | 55 | — | — |
| | | W1 | 5.0 | 5.0 | 5.0 | — | — | 76 |
| Example A9 | Pretreatment agent A4-2 (Printed fabric sample A4-2) | Bk1 | 4.0 | 4.0 | 4.0 | — | 1.22 | — |
| | | C1 | 4.5 | 4.5 | 4.0 | 43 | — | — |
| | | M1 | 4.5 | 4.5 | 4.5 | 46 | — | — |
| | | Y1 | 5.0 | 5.0 | 4.5 | 55 | — | — |
| | | W1 | 5.0 | 5.0 | 4.5 | — | — | 79 |
| Example A10 | Pretreatment agent A4-3 (Printed fabric sample A4-3) | Bk1 | 4.0 | 4.0 | 5.0 | — | 1.22 | — |
| | | C1 | 4.5 | 4.5 | 5.0 | 43 | — | — |
| | | M1 | 4.5 | 4.5 | 5.0 | 46 | — | — |
| | | Y1 | 5.0 | 5.0 | 5.0 | 55 | — | — |
| | | W1 | 4.5 | 4.5 | 5.0 | — | — | 78 |

TABLE 2-continued

Results of abrasion resistance test, dry-cleaning test, and color-developing property in Examples A8 to A12

|  |  |  | Abrasion resistance test | | Dry-cleaning test | Color-developing property | | |
|---|---|---|---|---|---|---|---|---|
| | Pretreatment agent | Ink | Dry | Wet | test | Saturation | OD | Degree of Whiteness |
| Example A11 | Pretreatment agent A4-4 (Printed fabric sample A4-4) | Bk1 | 4.0 | 4.0 | 5.0 | — | 1.23 | — |
| | | C1 | 4.5 | 4.5 | 5.0 | 44 | — | — |
| | | M1 | 4.5 | 4.5 | 5.0 | 45 | — | — |
| | | Y1 | 5.0 | 5.0 | 5.0 | 55 | — | — |
| | | W1 | 4.5 | 4.5 | 5.0 | — | — | 80 |
| Example A12 | Pretreatment agent A4-5 (Printed fabric sample A4-5) | Bk1 | 4.0 | 4.0 | 4.0 | — | 1.23 | — |
| | | C1 | 4.0 | 4.0 | 4.0 | 46 | — | — |
| | | M1 | 4.0 | 4.0 | 4.0 | 47 | — | — |
| | | Y1 | 4.5 | 4.5 | 4.5 | 57 | — | — |
| | | W1 | 4.0 | 4.0 | 4.5 | — | — | 81 |

TABLE 3

Results of abrasion resistance test, dry-cleaning test, and color-developing property in Examples A13 to A17

|  |  |  | Abrasion resistance test | | Dry-cleaning test | Color-developing property | | |
|---|---|---|---|---|---|---|---|---|
| | Pretreatment agent | Ink | Dry | Wet | test | Saturation | OD | Degree of Whiteness |
| Example A13 | Pretreatment agent A5-1 (Printed fabric sample A5-1) | Bk1 | 4.5 | 4.5 | 5.0 | — | 1.19 | — |
| | | C1 | 4.5 | 4.5 | 5.0 | 40 | — | — |
| | | M1 | 4.5 | 4.5 | 5.0 | 42 | — | — |
| | | Y1 | 5.0 | 5.0 | 5.0 | 53 | — | — |
| | | W1 | 4.5 | 4.5 | 5.0 | — | — | 75 |
| Example A14 | Pretreatment agent A5-2 (Printed fabric sample A5-2) | Bk1 | 4.5 | 4.5 | 4.0 | — | 1.19 | — |
| | | C1 | 4.5 | 4.5 | 4.0 | 43 | — | — |
| | | M1 | 4.5 | 4.5 | 4.5 | 45 | — | — |
| | | Y1 | 5.0 | 5.0 | 4.5 | 55 | — | — |
| | | W1 | 4.5 | 4.5 | 4.5 | — | — | 76 |
| Example A15 | Pretreatment agent A5-3 (Printed fabric sample A5-3) | Bk1 | 4.5 | 4.5 | 5.0 | — | 1.20 | — |
| | | C1 | 4.5 | 4.5 | 5.0 | 42 | — | — |
| | | M1 | 4.5 | 4.5 | 5.0 | 44 | — | — |
| | | Y1 | 5.0 | 5.0 | 5.0 | 53 | — | — |
| | | W1 | 4.5 | 4.5 | 5.0 | — | — | 77 |
| Example A16 | Pretreatment agent A5-4 (Printed fabric sample A5-4) | Bk1 | 4.5 | 4.5 | 5.0 | — | 1.22 | — |
| | | C1 | 4.5 | 4.5 | 5.0 | 43 | — | — |
| | | M1 | 4.5 | 4.5 | 5.0 | 45 | — | — |
| | | Y1 | 5.0 | 5.0 | 5.0 | 55 | — | — |
| | | W1 | 4.5 | 4.5 | 5.0 | — | — | 78 |
| Example A17 | Pretreatment agent A5-5 (Printed fabric sample A5-5) | Bk1 | 4.0 | 4.0 | 4.0 | — | 1.20 | — |
| | | C1 | 4.0 | 4.0 | 4.0 | 43 | — | — |
| | | M1 | 4.5 | 4.5 | 4.0 | 44 | — | — |
| | | Y1 | 4.5 | 4.5 | 4.5 | 53 | — | — |
| | | W1 | 4.5 | 4.5 | 4.5 | — | — | 76 |

TABLE 4

Results of abrasion resistance test, dry-cleaning test, and color-developing property in Examples A18

| | | | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| Hemp | Pretreatment agent A1 (Printed fabric sample A6) | Bk1 | 4.0 | 4.0 | 4.5 | — | 1.20 | — |
| | | C1 | 4.0 | 4.0 | 4.5 | 43 | — | — |
| | | M1 | 4.5 | 4.5 | 4.5 | 45 | — | — |
| | | Y1 | 4.5 | 4.5 | 4.5 | 55 | — | — |
| | | W1 | 4.5 | 4.5 | 4.5 | — | — | 76 |
| Rayon fiber | Pretreatment agent A1 (Printed fabric sample A7) | Bk1 | 4.0 | 4.0 | 4.5 | — | 1.15 | — |
| | | C1 | 4.0 | 4.0 | 4.5 | 41 | — | — |
| | | M1 | 4.5 | 4.5 | 4.5 | 42 | — | — |
| | | Y1 | 4.5 | 4.5 | 4.5 | 52 | — | — |
| | | W1 | 4.5 | 4.5 | 4.5 | — | — | 78 |
| Acetate fiber | Pretreatment agent A1 (Printed fabric sample A8) | Bk1 | 4.0 | 4.0 | 4.5 | — | 1.18 | — |
| | | C1 | 4.0 | 4.0 | 4.5 | 44 | — | — |
| | | M1 | 4.5 | 4.5 | 4.5 | 46 | — | — |
| | | Y1 | 4.5 | 4.5 | 4.5 | 56 | — | — |
| | | W1 | 4.5 | 4.5 | 4.5 | — | — | 80 |
| Silk | Pretreatment agent A1 (Printed fabric sample A9) | Bk1 | 4.0 | 4.0 | 4.0 | — | 1.11 | — |
| | | C1 | 4.0 | 4.0 | 4.0 | 42 | — | — |
| | | M1 | 4.0 | 4.0 | 5.0 | 43 | — | — |
| | | Y1 | 4.0 | 4.0 | 5.0 | 53 | — | — |
| | | W1 | 4.0 | 4.0 | 5.0 | — | — | 71 |
| Nylon fiber | Pretreatment agent A1 (Printed fabric sample A10) | Bk1 | 4.0 | 4.0 | 4.0 | — | 1.18 | — |
| | | C1 | 4.0 | 4.0 | 4.0 | 42 | — | — |
| | | M1 | 4.0 | 4.0 | 4.0 | 44 | — | — |
| | | Y1 | 4.0 | 4.0 | 5.0 | 54 | — | — |
| | | W1 | 4.0 | 4.0 | 5.0 | — | — | 72 |
| Polyester fiber | Pretreatment agent A1 (Printed fabric sample A11) | Bk2 | 4.0 | 4.0 | 4.0 | — | 1.10 | — |
| | | C2 | 4.0 | 4.0 | 4.0 | 41 | — | — |
| | | M2 | 4.0 | 4.0 | 4.0 | 42 | — | — |
| | | Y2 | 4.0 | 4.0 | 4.0 | 51 | — | — |
| | | W2 | 4.0 | 4.0 | 4.0 | — | — | 70 |

TABLE 5

Results of abrasion resistance test, dry-cleaning test, and color-developing property in Comparative Examples A1 to A5

| | | | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| Comparative Example A1 | Pretreatment agent A6 (Printed fabric sample A12) | Bk1 | 3.0 | 3.0 | 4.0 | — | 1.02 | — |
| | | C1 | 3.0 | 3.0 | 4.0 | 33 | — | — |
| | | M1 | 3.0 | 3.0 | 4.0 | 38 | — | — |
| | | Y1 | 3.0 | 2.5 | 4.0 | 46 | — | — |
| | | W1 | 2.0 | 2.0 | 4.0 | — | — | 25 |
| Comparative Example A2 | Pretreatment agent A7 (Printed fabric sample A13) | Bk1 | 3.0 | 1.5 | 4.0 | — | 1.24 | — |
| | | C1 | 3.0 | 1.5 | 4.0 | 44 | — | — |
| | | M1 | 3.5 | 2.0 | 4.0 | 46 | — | — |
| | | Y1 | 3.5 | 2.0 | 4.0 | 57 | — | — |
| | | W1 | 3.0 | 2.0 | 4.5 | — | — | 80 |
| Comparative Example A3 | Pretreatment agent A8 (Printed fabric sample A14) | Bk1 | 4.0 | 3.0 | 3.0 | — | 1.12 | — |
| | | C1 | 4.0 | 3.0 | 3.0 | 40 | — | — |
| | | M1 | 5.0 | 4.0 | 3.0 | 44 | — | — |
| | | Y1 | 5.0 | 4.0 | 3.0 | 56 | — | — |
| | | W1 | 4.0 | 4.0 | 4.0 | — | — | 83 |
| Comparative Example A4 | Pretreatment agent A9 (Printed fabric sample A15) | Bk1 | 3.0 | 3.0 | 2.5 | — | 1.23 | — |
| | | C1 | 3.0 | 3.0 | 3.0 | 45 | — | — |
| | | M1 | 3.0 | 3.0 | 3.0 | 47 | — | — |
| | | Y1 | 3.0 | 2.5 | 3.0 | 57 | — | — |
| | | W1 | 2.0 | 2.0 | 3.0 | — | — | 80 |

TABLE 5-continued

Results of abrasion resistance test, dry-cleaning test, and
color-developing property in Comparative Examples A1 to A5

| | | | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| Comparative Example A5 | Pretreatment agent A10 (Printed fabric sample A16) | Bk1 | 4.0 | 4.0 | 5.0 | — | 1.05 | — |
| | | C1 | 4.0 | 4.0 | 5.0 | 37 | — | — |
| | | M1 | 4.4 | 4.5 | 5.0 | 40 | — | — |
| | | Y1 | 4.5 | 4.5 | 5.0 | 43 | — | — |
| | | W1 | 4.0 | 4.0 | 4.0 | — | — | 55 |

EXAMPLE B

Example B1

Preparation of Pretreatment Agent B1
(1) Production of Polymer Fine Particles 1
The polymer fine particles 1 in Example A were used.
(2) Production of Pretreatment Agent B1
The following additives were sequentially mixed, stirred, and filtered through 5 μm filter to prepare pretreatment agent B1:
EM-a (solid content: 40%): 25.0%,
polyallylamine hydrochloride polymer (PAA-HCL-3L, a product of Nitto Boseki Co., Ltd.): 10.0%,
Olfine E1010 (acetylene glycol surfactant, a product of Nissin Chemical Industry Co., Ltd.): 1.2%,
1,2-hexanediol: 0.5%,
triethylene glycol: 0.5%, and
ion-exchanged water: balance.
Preparation of Black Ink 1, Cyan Ink 1, Magenta Ink 1, Yellow Ink 1, and White Ink 1 for Ink Jet Recording
The black ink 1, the cyan ink 1, the magenta ink 1, the yellow ink 1, and the white ink 1 in Example A were used.
Production of Printed Fabric Sample B1
Printed fabric sample B1 was produced as in printed fabric sample A1 in Example A1 except that the pretreatment agent B1 was used.
(1) Abrasion Resistance Test and Dry-cleaning Test
The abrasion resistance and the dry-cleaning of the printed fabric sample B1 were evaluated by the same methods as in Example A1. The results of the abrasion resistance test and the dry-cleaning test are shown in Table 1.
(2) Measurement of Color-developing Property
The color-development property of the printed fabric sample B1 was evaluated by the same method as in Example A1. The results are shown in Table 6.

Example B2

Preparation of Pretreatment Agent B2
(1) Production of Pretreatment Agent B2
Pretreatment agent B2 was prepared as in the pretreatment agent B1 except that an allylamine hydrochloride/diallylamine hydrochloride copolymer (PAA-D4-HCL, a product of Nitto Boseki Co., Ltd.) was used as the cationic polymer instead of the polyallylamine hydrochloride polymer (PAA-HCL-3L, a product of Nitto Boseki Co., Ltd.).
Preparation of Black Ink 2, Cyan Ink 2, Magenta Ink 2, Yellow Ink 2, and White Ink 2 for Ink Jet Recording
The black ink 2, the cyan ink 2, the magenta ink 2, the yellow ink 2, and the white ink 2 in Example A were used.
Production of Printed Fabric Sample B2
Printed fabric sample B2 was produced as in printed fabric sample A1 in Example A1 except that the pretreatment agent B2 was used.
(1) Abrasion Resistance Test and Dry-cleaning Test
The abrasion resistance and the dry-cleaning of the printed fabric sample B2 were evaluated by the same methods as in Example A1. The results of the abrasion resistance test and the dry-cleaning test are shown in Table 6.
(2) Measurement of Color-developing Property
The color-development property of the printed fabric sample B2 was evaluated by the same method as in Example A1. The results are shown in. Table 6.

Examples B3 to B7

Printed fabric samples B3-1 to B3-5 were produced as in Example B1 except that the emulsions b1 to b5 (EM-b1 to EM-b5) were used for the pretreatment agents B3-1 to B3-5 (Examples B3 to B7). Note, however, that since, in Example B7, application by ink jet recording could not be achieved, application was performed by padding. The printed fabric samples B3-1 to B3-5 were subjected to the abrasion resistance test, dry-cleaning test, and measurement of color developing property as in Example A1. The results are shown in Table 6.

Examples B8 to B12

Printed fabric samples B4-1 to B4-5 were produced as in Example B1 except that the emulsions c1 to c5 (EM-c1 to EM-c5) were used for the pretreatment agents B4-1 to B4-5 (Examples B8 to B12). The printed fabric samples B4-1 to B4-5 were subjected to the abrasion resistance test, dry-cleaning test, and measurement of color-developing property as in Example A1. The results are shown in Table 7.

Examples B13 to B17

Printed fabric samples B5-1 to B5-5 were produced as in Example B1 except that the emulsions d1 to d5 (EM-d1 to EM-d5) were used for the pretreatment agents B5-1 to B5-5 (Examples B13 to B17). The printed fabric samples B5-1 to B5-5 were subjected to the abrasion resistance test, dry-cleaning test, and measurement of color-developing property as in Example A1. The results are shown in Table 8.

Example B18

Printed matters were formed on fabric of hemp (printed fabric sample B6), rayon fiber (printed fabric sample B7), acetate fiber (printed fabric sample B8), silk (printed fabric sample B9), nylon fiber (printed fabric sample B10), and polyester fiber (printed fabric sample B11), instead of cotton in Example B1. The printed fabric samples B6 to B11 were subjected to the abrasion resistance test, dry-cleaning test, and measurement of color-developing property as in Example A1. The results are shown in Table 9.

Comparative Example B1

Printed fabric sample B12 was produced as in Example B1 except that the polyallylamine hydrochloride polymer (PAA-HCL-3L, a product of Nitto Boseki Co., Ltd.) serving as the cationic polymer in pretreatment agent B1 in Example B1 was not contained in pretreatment agent B6. The printed fabric sample B12 was subjected to the abrasion resistance test, dry-cleaning test, and measurement of color-developing property as in Example A1. The results are shown in Table 10.

Comparative Example B2

Printed fabric sample B13 was produced as in Example B1 except that the emulsion e (EM-e) was used for pretreatment agent B7. The printed fabric sample B13 was subjected to the abrasion resistance test, dry-cleaning test, and measurement of color-developing property as in Example A1. The results are shown in Table 10.

Comparative Example B3

Polymer fine particles having a molecular weight of 50000 were produced as in Example B1 by adjusting the amount of the polymerization initiator by a known method. Printed fabric sample B14 was produced as in Example B1 except that emulsion i (EM-i) having a solid content of 40%, an aqueous solution of the polymer fine particles, was used for pretreatment agent B8. The printed fabric sample B14 was subjected to the abrasion resistance test, dry-cleaning test, and measurement of color-developing property as in Example A1. The results are shown in Table 10.

Comparative Example B4

Printed fabric sample B15 was produced as in Example B1 except that pretreatment agent B9 prepared by using the emulsion g (EM-g) was used without performing filtration with a filter and that since application by ink jet recording could not be achieved, application was performed by padding. The printed fabric sample B15 was subjected to the abrasion resistance test, dry-cleaning test, and measurement of color-developing property as in Example A1. The results are shown in Table 10.

Comparative Example B5

Printed fabric sample B16 was produced as in Example B1 except that the emulsion h (EM-h) was used for pretreatment agent B10. The printed fabric sample B16 was subjected to the abrasion resistance test, dry-cleaning test, and measurement of color developing property as in Example A1. The results are shown in Table 10.

TABLE 6

Results of abrasion resistance test, dry-cleaning test, and color-developing property in Examples B1 to B7

| | Pretreatment agent | Ink | Abrasion resistance test Dry | Wet | Dry-cleaning test | Color-developing property Saturation | OD | Degree of Whiteness |
|---|---|---|---|---|---|---|---|---|
| Example B1 | Pretreatment agent B1 (Printed fabric sample B1) | Bk1 | 4.0 | 4.0 | 4.5 | — | 1.20 | — |
| | | C1 | 4.0 | 4.0 | 4.5 | 42 | — | — |
| | | M1 | 4.5 | 4.5 | 4.5 | 43 | — | — |
| | | Y1 | 4.5 | 4.5 | 4.5 | 51 | — | — |
| | | W1 | 4.5 | 4.5 | 4.5 | — | — | 77 |
| Example B2 | Pretreatment agent B2 (Printed fabric sample B2) | Bk2 | 4.0 | 4.0 | 4.0 | — | 1.20 | — |
| | | C2 | 4.0 | 4.0 | 4.0 | 42 | — | — |
| | | M2 | 4.5 | 4.5 | 4.5 | 42 | — | — |
| | | Y2 | 5.0 | 5.0 | 4.5 | 52 | — | — |
| | | W2 | 4.5 | 4.5 | 4.5 | — | — | 77 |
| Example B3 | Pretreatment agent B3-1 (Printed fabric sample B3-1) | Bk1 | 4.0 | 4.0 | 4.5 | — | 1.17 | — |
| | | C1 | 4.0 | 4.0 | 4.5 | 42 | — | — |
| | | M1 | 4.0 | 4.0 | 4.5 | 44 | — | — |
| | | Y1 | 4.5 | 4.5 | 4.5 | 51 | — | — |
| | | W1 | 4.5 | 4.5 | 4.5 | — | — | 70 |
| Example B4 | Pretreatment agent B3-2 (Printed fabric sample B3-2) | Bk1 | 4.0 | 4.0 | 4.5 | — | 1.22 | — |
| | | C1 | 4.0 | 4.0 | 4.5 | 42 | — | — |
| | | M1 | 4.5 | 4.5 | 4.5 | 46 | — | — |
| | | Y1 | 5.0 | 5.0 | 4.5 | 54 | — | — |
| | | W1 | 4.5 | 4.5 | 4.5 | — | — | 75 |
| Example B5 | Pretreatment agent B3-3 (Printed fabric sample B3-3) | Bk1 | 4.0 | 4.0 | 4.5 | — | 1.21 | — |
| | | C1 | 4.5 | 4.5 | 4.5 | 42 | — | — |
| | | M1 | 4.5 | 4.5 | 4.5 | 44 | — | — |
| | | Y1 | 5.0 | 5.0 | 4.5 | 53 | — | — |
| | | W1 | 4.5 | 4.5 | 4.5 | — | — | 75 |
| Example B6 | Pretreatment agent B3-4 (Printed fabric sample B3-4) | Bk1 | 4.0 | 4.0 | 4.5 | — | 1.21 | — |
| | | C1 | 4.0 | 4.0 | 4.5 | 42 | — | — |
| | | M1 | 4.5 | 4.5 | 4.5 | 45 | — | — |

TABLE 6-continued

Results of abrasion resistance test, dry-cleaning test, and color-developing property in Examples B1 to B7

|  | Pretreatment agent | Ink | Abrasion resistance test Dry | Abrasion resistance test Wet | Dry-cleaning test | Color-developing property Saturation | Color-developing property OD | Degree of Whiteness |
|---|---|---|---|---|---|---|---|---|
|  |  | Y1 | 5.0 | 5.0 | 4.5 | 55 | — | — |
|  |  | W1 | 4.5 | 4.5 | 4.5 | — | — | 75 |
| Example B7 | Pretreatment agent B3-5 (Printed fabirc sample B3-5) | Bk1 | 4.0 | 4.0 | 4.0 | — | 1.20 | — |
|  |  | C1 | 4.0 | 4.0 | 4.0 | 43 | — | — |
|  |  | M1 | 4.0 | 4.0 | 4.0 | 46 | — | — |
|  |  | Y1 | 4.5 | 4.5 | 4.0 | 56 | — | — |
|  |  | W1 | 4.0 | 4.0 | 4.0 | — | — | 78 |

TABLE 7

Results of abrasion resistance test, dry-cleaning test, and color-developing property in Examples B8 to B12

|  | Pretreatment agent | Ink | Abrasion resistance test Dry | Abrasion resistance test Wet | Dry-cleaning test | Color-developing property Saturation | Color-developing property OD | Degree of Whiteness |
|---|---|---|---|---|---|---|---|---|
| Example B8 | Pretreatment agent B4-1 (Printed fabric sample B4-1) | Bk1 | 4.0 | 4.0 | 4.5 | — | 1.16 | — |
|  |  | C1 | 4.0 | 4.0 | 4.5 | 42 | — | — |
|  |  | M1 | 4.5 | 4.5 | 4.5 | 43 | — | — |
|  |  | Y1 | 4.5 | 4.5 | 4.5 | 51 | — | — |
|  |  | W1 | 4.5 | 4.5 | 4.5 | — | — | 75 |
| Example B9 | Pretreatment agent B4-2 (Printed fabric sample B4-2) | Bk1 | 4.0 | 4.0 | 4.5 | — | 1.18 | — |
|  |  | C1 | 4.5 | 4.5 | 4.5 | 42 | — | — |
|  |  | M1 | 4.5 | 4.5 | 4.5 | 43 | — | — |
|  |  | Y1 | 4.5 | 4.5 | 4.5 | 51 | — | — |
|  |  | W1 | 4.5 | 4.5 | 4.5 | — | — | 77 |
| Example B10 | Pretreatment agent B4-3 (Printed fabric sample B4-3) | Bk1 | 4.0 | 4.0 | 4.5 | — | 1.20 | — |
|  |  | C1 | 4.0 | 4.0 | 4.5 | 42 | — | — |
|  |  | M1 | 4.5 | 4.5 | 4.5 | 43 | — | — |
|  |  | Y1 | 4.5 | 4.5 | 4.5 | 51 | — | — |
|  |  | W1 | 4.5 | 4.5 | 4.5 | — | — | 77 |
| Example B11 | Pretreatment agent B4-4 (Printed fabric sample B4-4) | Bk1 | 4.0 | 4.0 | 4.5 | — | 1.20 | — |
|  |  | C1 | 4.0 | 4.0 | 4.5 | 42 | — | — |
|  |  | M1 | 4.5 | 4.5 | 4.5 | 43 | — | — |
|  |  | Y1 | 4.5 | 4.5 | 4.5 | 51 | — | — |
|  |  | W1 | 4.5 | 4.5 | 4.5 | — | — | 76 |
| Example B12 | Pretreatment agent B4-5 (Printed fabric sample B4-5) | Bk1 | 4.0 | 4.0 | 4.0 | — | 1.18 | — |
|  |  | C1 | 4.0 | 4.0 | 4.0 | 42 | — | — |
|  |  | M1 | 4.0 | 4.0 | 4.0 | 43 | — | — |
|  |  | Y1 | 4.5 | 4.5 | 4.0 | 52 | — | — |
|  |  | W1 | 4.0 | 4.0 | 4.5 | — | — | 78 |

TABLE 8

Results of abrasion resistance test, dry-cleaning test, and color-developing property in Examples B13 to B17

|  | Pretreatment agent | Ink | Abrasion resistance test Dry | Abrasion resistance test Wet | Dry-cleaning test | Color-developing property Saturation | Color-developing property OD | Degree of Whiteness |
|---|---|---|---|---|---|---|---|---|
| Example B13 | Pretreatment agent B5-1 (Printed fabric sample B5-1) | Bk1 | 4.0 | 4.0 | 4.0 | — | 1.22 | — |
|  |  | C1 | 4.0 | 4.0 | 4.0 | 44 | — | — |
|  |  | M1 | 4.5 | 4.5 | 4.5 | 43 | — | — |

TABLE 8-continued

Results of abrasion resistance test, dry-cleaning test, and color-developing property in Examples B13 to B17

|  |  |  | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| | | Y1 | 4.5 | 4.5 | 4.5 | 55 | — | — |
| | | W1 | 4.5 | 4.5 | 4.5 | — | — | 77 |
| Example B14 | Pretreatment agent B5-2 (Printed fabric sample B5-2) | Bk1 | 4.0 | 4.0 | 4.5 | — | 1.21 | — |
| | | C1 | 4.0 | 4.0 | 4.5 | 43 | — | — |
| | | M1 | 4.5 | 4.5 | 4.5 | 43 | — | — |
| | | Y1 | 4.5 | 4.5 | 4.5 | 53 | — | — |
| | | W1 | 4.5 | 4.5 | 4.5 | — | — | 79 |
| Example B15 | Pretreatment agent B5-3 (Printed fabric sample B5-3) | Bk1 | 4.0 | 4.0 | 4.5 | — | 1.20 | — |
| | | C1 | 4.0 | 4.0 | 4.5 | 42 | — | — |
| | | M1 | 4.5 | 4.5 | 4.5 | 43 | — | — |
| | | Y1 | 4.5 | 4.5 | 4.5 | 51 | — | — |
| | | W1 | 4.5 | 4.5 | 4.5 | — | — | 78 |
| Example B16 | Pretreatment agent B5-4 (Printed fabric sample B5-4) | Bk1 | 4.0 | 4.0 | 4.5 | — | 1.20 | — |
| | | C1 | 4.5 | 4.5 | 4.5 | 42 | — | — |
| | | M1 | 4.5 | 4.5 | 4.5 | 43 | — | — |
| | | Y1 | 4.5 | 4.5 | 4.5 | 51 | — | — |
| | | W1 | 4.5 | 4.5 | 4.5 | — | — | 77 |
| Example B17 | Pretreatment agent B5-5 (Printed fabric sample B5-5) | Bk1 | 4.0 | 4.0 | 4.0 | — | 1.20 | — |
| | | C1 | 4.0 | 4.0 | 4.0 | 42 | — | — |
| | | M1 | 4.5 | 4.5 | 4.0 | 43 | — | — |
| | | Y1 | 4.5 | 4.5 | 4.0 | 51 | — | — |
| | | W1 | 4.5 | 4.5 | 4.0 | — | — | 77 |

TABLE 9

Results of abrasion resistance test, dry-cleaning test, and color-developing property in Examples B18

|  |  |  | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| Hemp | Pretreatment agent B1 (Printed fabric sample B6) | Bk1 | 4.0 | 4.0 | 4.0 | — | 1.21 | — |
| | | C1 | 4.0 | 4.0 | 4.0 | 44 | — | — |
| | | M1 | 4.0 | 4.0 | 4.5 | 46 | — | — |
| | | Y1 | 4.5 | 4.5 | 4.5 | 57 | — | — |
| | | W1 | 4.5 | 4.5 | 4.5 | — | — | 78 |
| Rayon fiber | Pretreatment agent B1 (Printed fabric sample B7) | Bk1 | 4.0 | 4.0 | 4.0 | — | 1.12 | — |
| | | C1 | 4.0 | 4.0 | 4.0 | 41 | — | — |
| | | M1 | 4.5 | 4.5 | 4.5 | 42 | — | — |
| | | Y1 | 4.5 | 4.5 | 4.5 | 52 | — | — |
| | | W1 | 4.5 | 4.5 | 4.5 | — | — | 74 |
| Acetate fiber | Pretreatment agent B1 (Printed fabric sample B8) | Bk1 | 4.0 | 4.0 | 4.0 | — | 1.16 | — |
| | | C1 | 4.0 | 4.0 | 4.0 | 44 | — | — |
| | | M1 | 4.5 | 4.5 | 4.5 | 46 | — | — |
| | | Y1 | 4.5 | 4.5 | 4.5 | 56 | — | — |
| | | W1 | 4.5 | 4.5 | 4.5 | — | — | 78 |
| Silk | Pretreatment agent B1 (Printed fabric sample B9) | Bk1 | 4.0 | 4.0 | 4.0 | — | 1.10 | — |
| | | C1 | 4.0 | 4.0 | 4.0 | 41 | — | — |
| | | M1 | 4.0 | 4.0 | 4.5 | 42 | — | — |
| | | Y1 | 4.0 | 4.0 | 4.5 | 52 | — | — |
| | | W1 | 4.0 | 4.0 | 4.5 | — | — | 71 |
| Nylon fiber | Pretreatment agent B1 (Printed fabric sample B10) | Bk1 | 4.0 | 4.0 | 4.0 | — | 1.16 | — |
| | | C1 | 4.0 | 4.0 | 4.0 | 41 | — | — |
| | | M1 | 4.0 | 4.0 | 4.0 | 42 | — | — |
| | | Y1 | 4.0 | 4.0 | 4.5 | 52 | — | — |
| | | W1 | 4.0 | 4.0 | 4.5 | — | — | 71 |
| Polyester fiber | Pretreatment agent B1 (Printed fabric sample B11) | Bk2 | 4.0 | 4.0 | 4.0 | — | 1.10 | — |
| | | C2 | 4.0 | 4.0 | 4.0 | 40 | — | — |
| | | M2 | 4.0 | 4.0 | 4.0 | 41 | — | — |
| | | Y2 | 4.0 | 4.0 | 4.0 | 50 | — | — |
| | | W2 | 4.0 | 4.0 | 4.0 | — | — | 70 |

TABLE 10

Results of abrasion resistance test, dry-cleaning test, and color-developing property in Comparative Examples B1 to B5

| | | | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| Comparative Example B1 | Pretreatment agent B6 (Printed fabric sample B12) | Bk1 | 3.0 | 3.0 | 4.0 | — | 1.02 | — |
| | | C1 | 3.0 | 3.0 | 4.0 | 32 | — | — |
| | | M1 | 3.0 | 3.0 | 4.0 | 36 | — | — |
| | | Y1 | 3.0 | 2.5 | 4.0 | 41 | — | — |
| | | W1 | 2.0 | 2.0 | 4.0 | — | — | 25 |
| Comparative Example B2 | Pretreatment agent B7 (Printed fabric sample B13) | Bk1 | 3.0 | 1.5 | 4.0 | — | 1.20 | — |
| | | C1 | 3.0 | 1.5 | 4.0 | 43 | — | — |
| | | M1 | 3.5 | 2.0 | 4.5 | 42 | — | — |
| | | Y1 | 3.5 | 2.0 | 4.5 | 54 | — | — |
| | | W1 | 3.0 | 2.0 | 4.5 | — | — | 78 |
| Comparative Example B3 | Pretreatment agent B8 (Printed fabric sample B14) | Bk1 | 4.0 | 3.0 | 3.0 | — | 1.11 | — |
| | | C1 | 4.0 | 3.0 | 3.0 | 40 | — | — |
| | | M1 | 4.5 | 3.5 | 3.0 | 44 | — | — |
| | | Y1 | 4.5 | 3.5 | 3.0 | 56 | — | — |
| | | W1 | 4.0 | 3.5 | 3.5 | — | — | 79 |
| Comparative Example B4 | Pretreatment agent B9 (Printed fabric sample B15) | Bk1 | 3.0 | 3.0 | 2.5 | — | 1.23 | — |
| | | C1 | 3.0 | 3.0 | 3.0 | 45 | — | — |
| | | M1 | 3.0 | 3.0 | 3.0 | 47 | — | — |
| | | Y1 | 3.0 | 2.5 | 3.0 | 57 | — | — |
| | | W1 | 2.0 | 2.0 | 3.0 | — | — | 80 |
| Comparative Example B5 | Pretreatment agent B10 (Printed fabric sample B16) | Bk1 | 4.0 | 4.0 | 4.5 | — | 1.01 | — |
| | | C1 | 4.0 | 4.0 | 4.5 | 36 | — | — |
| | | M1 | 4.4 | 4.5 | 4.5 | 40 | — | — |
| | | Y1 | 4.5 | 4.5 | 4.5 | 42 | — | — |
| | | W1 | 4.0 | 4.0 | 4.0 | — | — | 53 |

EXAMPLE C

Example C1

Preparation of Pretreatment Agent C1
(1) Production of Cationic Polymer Fine Particles 1

Ion-exchanged water (100 parts) was placed in a reaction container equipped with a dropping device, a thermometer, a water-cooled reflux condenser, and a stirrer, and Potassium persulfate (0.2 parts) serving as a polymerization initiator was added to the reaction container at 70° C. with stirring under a nitrogen atmosphere. A monomer solution composed of ion-exchanged water (7 parts), sodium lauryl sulfate (0.05 parts), glycidoxy acrylate (4 parts), ethyl acrylate (15 parts), butyl acrylate (15 parts), tetrahydrofurfuryl acrylate (6 parts), butyl methacrylate (5 parts), and t-dodecyl mercaptan (0.02 parts) was dropwise added to the reaction container at 70° C. to prepare a primary material. To the primary material, 10% ammonium persulfate solution (2 parts) was added, followed by stirring. Furthermore, to the resulting mixture, a reaction solution composed of ion-exchanged water (30 parts), potassium lauryl sulfate (0.2 parts), ethyl acrylate (30 parts), methyl acrylate (15 parts), butyl acrylate (6 parts), allylamine (16 parts), and t-dodecyl mercaptan (0.5 parts) was added at 70° C. with stirring for polymerization, followed by filtration through a 0.3 μm filter to prepare a water dispersion of cationic polymer fine particles. The concentration of the dispersion was adjusted with water to obtain an emulsion α (EM-α) having a solid content of 40%. A portion of the water dispersion of the cationic polymer fine particles was dried, and the glass transition temperature thereof was measured with a differential scanning calorimetry (Exstar 6000 DSC, a product of Seiko Instruments Inc.) to be −15° C. The styrene reduced molecular weight measured with an L7100 system (a product of Hitachi, Ltd.) by gel permeation chromatography (GPC) using THF as a solvent was 150000. The particle diameter measured with a Microtrac particle size distribution analyzer UPA250 (Nikkiso Co., Ltd.) was 190 nm.

(2) Production of Pretreatment Agent C1

The following additives were sequentially mixed, stirred, and filtered through a 5 μm filter to prepare pretreatment agent C1:

EM-α (solid content: 40%): 25.0%,
Olfine E1010 (a product of Nissin Chemical Industry Co., Ltd.): 1.2%,
Proxel XLII (a product of Arch Chemicals Japan, Inc.): 1,2-hexanediol: 0.5%,
triethylene glycol: 0.5%, and
ion-exchanged water: balance.

Preparation of Black Ink 1, Cyan Ink 1, Magenta Ink 1, Yellow Ink 1, and White Ink 1 for Ink Jet Recording The black ink 1, the cyan ink 1, the magenta ink 1 the yellow ink 1, and the white ink 1 in Example A were used.

Production of Printed Fabric Sample C1

Printed fabric sample C1 was produced as in printed fabric sample A1 in Example A1 except that the pretreatment agent C1 was used.

(1) Abrasion Resistance Test and Dry-cleaning Test

The abrasion resistance and the dry-cleaning of the printed fabric sample C1 were evaluated by the same methods as in Example A1. The results of the abrasion resistance test and the dry-cleaning test are shown in Table 11.

(2) Measurement of Color-developing Property

The color-development property of the printed fabric sample C1 was evaluated by the same method as in Example A1. The results are shown in Table 11.

Example C2

Preparation of Pretreatment Agent C2
(1) Production of Cationic Polymer Fine Particles 2

Water dispersion of cationic polymer fine particles was produced as in production of cationic polymer fine particles 1 except that allylamine (10 parts) and dimethyl allylamine (6 parts) were used instead of allylamine (16 parts). The concentration of the dispersion was adjusted with water to obtain an emulsion β (EM-β) having a solid content of 40%. A portion of the water dispersion of the cationic polymer fine particles was dried, and the glass transition temperature thereof was measured with a differential scanning calorimetry (Exstar 6000 DSC, a product of Seiko Instruments Inc.) to be −14° C. The styrene-reduced molecular weight measured with an L7100 system (a product of Hitachi, Ltd.) by gel permeation chromatography (GPC) using THF as a solvent was 160000. The particle diameter measured with a Microtrac particle size distribution analyzer UPA250 (Nikkiso Co., Ltd.) was 180 nm.

Pretreatment agent C2 was prepared as in preparation of the pretreatment agent C1 except that EM-β was used instead of EM-α.

Preparation of Black Ink 2, Cyan Ink 2, Magenta Ink 2, Yellow Ink 2, and White Ink 2 for Ink Jet Recording The black ink 2, the cyan ink 2, the magenta ink 2, the yellow ink 2, and the white ink 2 in Example A were used.

Production of Printed Fabric Sample C2

Printed fabric sample C2 was produced as in printed fabric sample A1 in Example A1 except that the pretreatment agent C2 was used.

(1) Abrasion Resistance Test and Dry-cleaning Test

The abrasion resistance and the dry-cleaning of the printed fabric sample C2 were evaluated by the same methods as in Example A1. The results of the abrasion resistance test and the dry-cleaning test are shown in Table 11.

(2) Measurement of Color-developing Property

The color-development property of the printed fabric sample C2 was evaluated by the same method as in Example A1. The results are shown in Table 11.

Examples C2 to C7

Polymer fine particles having a particle diameter of 50 nm (Example C3), 300 nm (Example C4), 500 nm (Example C5), 1 μm (Example C6), or 5 μm (Example C7) were produced by a known method as in Example C1 by adjusting the stirring speed. Printed fabric samples C3-1 to C3-5 were produced as in Example C1 except that emulsions γ1 to γ5 (EM-γ1 to EM-γ5), aqueous solutions of the polymer fine particles, were used for the pretreatment agents C3-1 to C3-5. Note, however, that since, in Example C7, application by ink jet recording could not be achieved, application was performed by padding. The printed fabric samples C3-1 to C3-5 were subjected to the abrasion resistance test, dry-cleaning test, and measurement of color-developing property as in Example A1. The results are shown in Table 11.

Examples C5 to C12

Polymer fine particles having a glass transition temperature of −30° C. (Example C8), −25° C. (Example C9), −20° C. (Example C10), −13° C. (Example C11), or −10° C. (Example C12) were produced by a known method as in Example C1 except that lauryl acrylate was used instead of ethyl acrylate (30 parts). Printed fabric samples C4-1 to C4-5 were produced as in Example C1 except that the emulsions δ1 to δ5 (EM-δ1 to EM-δ5) having a solid content of 40%, aqueous solutions of the polymer fine particles, were used for the pretreatment agents C4-1 to C4-5. The printed fabric samples C4-1 to C4-5 were subjected to the abrasion resistance test, dry-cleaning test, and measurement of color-developing property as in Example A1. The results are shown in Table 12.

Example C13 to C17

Polymer fine particles having a molecular weight of 300000 (Example C13), 200000 (Example C14), 180000 (Example C15), 130000 (Example C16), or 100000 (Example C17) were produced as in Example C1 by adjusting the amount of the polymerization initiator by a known method. Printed fabric samples C5-1 to C5-5 were produced as in Example C1 except that emulsions ε1 to ε5 (EM-ε1 to EM-ε5) having a solid content of 40%, aqueous solutions of the polymer fine particles, were used for the pretreatment agents C5-1 to C5-5. The printed fabric samples C5-1 to C5-5 were subjected to the abrasion resistance test, dry-cleaning test, and measurement of color-developing property as in Example A1. The results are sown in Table 13.

Example C18

Printed matters were formed on fabric of hemp (printed fabric sample C6), rayon fiber (printed fabric sample C7), acetate fiber (printed fabric sample C8), silk (printed fabric sample C9), nylon fiber (printed fabric sample C10), and polyester fiber (printed fabric sample C11), instead of cotton in Example C1. The printed fabric samples C6 to C11 were subjected to the abrasion resistance test, dry-cleaning test, and measurement of color-developing property as in Example A1. The results are shown in Table 14.

Comparative Example C1

Printed fabric sample C12 was produced as in Example C1 except that the cationic polymer fine particles in pretreatment agent C1 in Example C1 was not contained in pretreatment agent C6. The printed fabric sample C12 was subjected to the abrasion resistance test, dry-cleaning test, and measurement of color-developing property as in Example A1. The results are shown in Table 15.

Comparative Example C2

Cationic polymer fine particles having a glass transition temperature of 15° C. were produced by a known method as in Example C1 except that styrene (30 parts) was used instead of ethyl acrylate (30 parts). Printed fabric sample C13 was produced as in Example C1 except that emulsion ζ (EM-ζ) having a solid content of 40%, an aqueous solution of the cationic polymer fine particles, was used for pretreatment agent C7. The printed fabric sample C13 was subjected to the abrasion resistance test, dry-cleaning test, and measurement of color-developing property as in Example A1. The results are shown in Table 15.

Comparative Example C3

Cationic polymer fine particles having a mass-average molecular weight of 80000 were produced as in Example C1 by adjusting the amount of the polymerization initiator by a known method. Printed fabric sample C14 was produced as in Example C1 except that emulsion η (EM-η) having a solid content of 40%, an aqueous solution of the cationic polymer fine particles, was used for pretreatment agent C8. The printed fabric sample C14 was subjected to the abrasion resistance test, dry-cleaning test, and measurement of color-developing property as in Example A1. The results are shown in Table 15.

Comparative Example C4

Cationic polymer fine particles having a particle diameter of 6 μm were produced as in Example C1 by adjusting stirring speed by a known method. Printed fabric sample C15 was produced as in Example C1 except that pretreatment agent C9 prepared by using emulsion θ (EM-θ) having a solid content of 40%, an aqueous solution of the cationic polymer fine particles, was used without performing filtration with a filter and that since application by ink jet recording could not be achieved, application was performed by padding. The printed fabric sample C15 was subjected to the abrasion resistance test, dry-cleaning test, and measurement of color-developing property as in Example A1. The results are shown in Table 15.

Comparative Example C5

Cationic polymer fine particles having a particle diameter of 30 nm were produced as in Example C1 by adjusting stirring speed by a known method. Printed fabric sample C16 was produced as in Example C1 except that emulsion ι (EM-ι) having a solid content of 40%, an aqueous solution of the cationic polymer fine particles, was used for pretreatment agent C10. The printed fabric sample C16 was subjected to the abrasion resistance test, dry-cleaning test, and measurement of color-developing property as in Example A1. The results are shown in Table 15.

TABLE 11

Results of abrasion resistance test, dry-cleaning test, and color-developing property in Examples C1 to C7

| | | | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| Example C1 | Pretreatment agent C1 (Printed fabric sample C1) | Bk1 | 4.0 | 4.0 | 4.0 | — | 1.18 | — |
| | | C1 | 4.0 | 4.0 | 4.0 | 41 | — | — |
| | | M1 | 4.0 | 4.0 | 4.5 | 42 | — | — |
| | | Y1 | 4.5 | 4.5 | 4.5 | 51 | — | — |
| | | W1 | 4.5 | 4.5 | 4.5 | — | — | 77 |
| Example C2 | Pretreatment agent C2 (Printed fabric sample C2) | Bk2 | 4.0 | 4.0 | 4.0 | — | 1.20 | — |
| | | C2 | 4.0 | 4.0 | 4.0 | 41 | — | — |
| | | M2 | 4.0 | 4.0 | 4.5 | 42 | — | — |
| | | Y2 | 4.5 | 4.5 | 4.5 | 52 | — | — |
| | | W2 | 4.5 | 4.0 | 4.5 | — | — | 77 |
| Example C3 | Pretreatment agent C3-1 (Printed fabric sample C3-1) | Bk1 | 4.0 | 4.0 | 4.0 | — | 1.16 | — |
| | | C1 | 4.0 | 4.0 | 4.0 | 41 | — | — |
| | | M1 | 4.0 | 4.0 | 4.5 | 42 | — | — |
| | | Y1 | 4.5 | 4.0 | 4.5 | 52 | — | — |
| | | W1 | 4.5 | 4.0 | 4.5 | — | — | 70 |
| Example C4 | Pretreatment agent C3-2 (Printed fabric sample C3-2) | Bk1 | 4.0 | 4.0 | 4.0 | — | 1.21 | — |
| | | C1 | 4.0 | 4.0 | 4.0 | 42 | — | — |
| | | M1 | 4.5 | 4.0 | 4.5 | 44 | — | — |
| | | Y1 | 5.0 | 4.5 | 4.5 | 52 | — | — |
| | | W1 | 4.5 | 4.5 | 4.5 | — | — | 75 |
| Example C5 | Pretreatment agent C3-3 (Printed fabric sample C3-3) | Bk1 | 4.0 | 4.0 | 4.0 | — | 1.20 | — |
| | | C1 | 4.5 | 4.0 | 4.0 | 42 | — | — |
| | | M1 | 4.5 | 4.0 | 4.5 | 42 | — | — |
| | | Y1 | 5.0 | 4.5 | 4.5 | 53 | — | — |
| | | W1 | 4.5 | 4.5 | 4.5 | — | — | 75 |
| Example C6 | Pretreatment agent C3-4 (Printed fabric sample C3-4) | Bk1 | 4.0 | 4.0 | 4.0 | — | 1.21 | — |
| | | C1 | 4.0 | 4.0 | 4.0 | 42 | — | — |
| | | M1 | 4.5 | 4.5 | 4.5 | 45 | — | — |
| | | Y1 | 5.0 | 4.5 | 4.5 | 55 | — | — |
| | | W1 | 4.5 | 4.5 | 4.5 | — | — | 75 |
| Example C7 | Pretreatment agent C3-5 (Printed fabirc sample C3-5) | Bk1 | 4.0 | 4.0 | 4.0 | — | 1.20 | — |
| | | C1 | 4.0 | 4.0 | 4.0 | 43 | — | — |
| | | M1 | 4.0 | 4.0 | 4.0 | 46 | — | — |
| | | Y1 | 4.5 | 4.0 | 4.0 | 56 | — | — |
| | | W1 | 4.0 | 4.0 | 4.0 | — | — | 78 |

TABLE 12

Results of abrasion resistance test, dry-cleaning test, and color-developing property in Examples C8 to C12

| | Pretreatment agent | Ink | Abrasion resistance test Dry | Abrasion resistance test Wet | Dry-cleaning test | Color-developing property Saturation | Color-developing property OD | Degree of Whiteness |
|---|---|---|---|---|---|---|---|---|
| Example C8 | Pretreatment agent C4-1 (Printed fabric sample C4-1) | Bk1 | 4.0 | 4.0 | 4.0 | — | 1.15 | — |
| | | C1 | 4.0 | 4.0 | 4.0 | 41 | — | — |
| | | M1 | 4.5 | 4.0 | 4.0 | 42 | — | — |
| | | Y1 | 4.5 | 4.0 | 4.5 | 51 | — | — |
| | | W1 | 4.5 | 4.0 | 4.5 | — | — | 74 |
| Example C9 | Pretreatment agent C4-2 (Printed fabric sample C4-2) | Bk1 | 4.0 | 4.0 | 4.0 | — | 1.16 | — |
| | | C1 | 4.0 | 4.0 | 4.0 | 41 | — | — |
| | | M1 | 4.5 | 4.0 | 4.5 | 43 | — | — |
| | | Y1 | 4.5 | 4.0 | 4.5 | 51 | — | — |
| | | W1 | 4.5 | 4.0 | 4.5 | — | — | 76 |
| Example C10 | Pretreatment agent C4-3 (Printed fabric sample C4-3) | Bk1 | 4.0 | 4.0 | 4.0 | — | 1.18 | — |
| | | C1 | 4.0 | 4.0 | 4.0 | 41 | — | — |
| | | M1 | 4.5 | 4.0 | 4.5 | 43 | — | — |
| | | Y1 | 4.5 | 4.0 | 4.5 | 51 | — | — |
| | | W1 | 4.5 | 4.0 | 4.5 | — | — | 76 |
| Example C11 | Pretreatment agent C4-4 (Printed fabric sample C4-4) | Bk1 | 4.0 | 4.0 | 4.0 | — | 1.18 | — |
| | | C1 | 4.0 | 4.0 | 4.0 | 42 | — | — |
| | | M1 | 4.5 | 4.0 | 4.5 | 43 | — | — |
| | | Y1 | 4.5 | 4.0 | 4.5 | 51 | — | — |
| | | W1 | 4.5 | 4.0 | 4.5 | — | — | 75 |
| Example C12 | Pretreatment agent C4-5 (Printed fabric sample C4-5) | Bk1 | 4.0 | 4.0 | 4.0 | — | 1.16 | — |
| | | C1 | 4.0 | 4.0 | 4.0 | 41 | — | — |
| | | M1 | 4.0 | 4.0 | 4.0 | 43 | — | — |
| | | Y1 | 4.5 | 4.0 | 4.0 | 52 | — | — |
| | | W1 | 4.0 | 4.0 | 4.0 | — | — | 76 |

TABLE 13

Results of abrasion resistance test, dry-cleaning test, and color-developing property in Examples C13 to C17

| | Pretreatment agent | Ink | Abrasion resistance test Dry | Abrasion resistance test Wet | Dry-cleaning test | Color-developing property Saturation | Color-developing property OD | Degree of Whiteness |
|---|---|---|---|---|---|---|---|---|
| Example C13 | Pretreatment agent C5-1 (Printed fabric sample C5-1) | Bk1 | 4.0 | 4.0 | 4.0 | — | 1.22 | — |
| | | C1 | 4.0 | 4.0 | 4.0 | 42 | — | — |
| | | M1 | 4.5 | 4.0 | 4.0 | 41 | — | — |
| | | Y1 | 4.5 | 4.0 | 4.0 | 53 | — | — |
| | | W1 | 4.5 | 4.0 | 4.0 | — | — | 77 |
| Example C14 | Pretreatment agent C5-2 (Printed fabric sample C5-2) | Bk1 | 4.0 | 4.0 | 4.0 | — | 1.21 | — |
| | | C1 | 4.0 | 4.0 | 4.0 | 43 | — | — |
| | | M1 | 4.5 | 4.0 | 4.5 | 43 | — | — |
| | | Y1 | 4.5 | 4.0 | 4.5 | 54 | — | — |
| | | W1 | 4.5 | 4.0 | 4.5 | — | — | 79 |
| Example C15 | Pretreatment agent C5-3 (Printed fabric sample C5-3) | Bk1 | 4.0 | 4.0 | 4.0 | — | 1.20 | — |
| | | C1 | 4.0 | 4.0 | 4.0 | 42 | — | — |
| | | M1 | 4.5 | 4.0 | 4.5 | 43 | — | — |
| | | Y1 | 4.5 | 4.0 | 4.5 | 51 | — | — |
| | | W1 | 4.5 | 4.0 | 4.5 | — | — | 78 |
| Example C16 | Pretreatment agent C5-4 (Printed fabric sample C5-4) | Bk1 | 4.0 | 4.0 | 4.0 | — | 1.20 | — |
| | | C1 | 4.0 | 4.0 | 4.0 | 42 | — | — |
| | | M1 | 4.5 | 4.0 | 4.5 | 43 | — | — |
| | | Y1 | 4.5 | 4.0 | 4.5 | 51 | — | — |
| | | W1 | 4.5 | 4.0 | 4.5 | — | — | 77 |
| Example C17 | Pretreatment agent C5-5 (Printed fabric sample C5-5) | Bk1 | 4.0 | 4.0 | 4.0 | — | 1.20 | — |
| | | C1 | 4.0 | 4.0 | 4.0 | 42 | — | — |
| | | M1 | 4.0 | 4.0 | 4.0 | 43 | — | — |
| | | Y1 | 4.5 | 4.5 | 4.0 | 51 | — | — |
| | | W1 | 4.5 | 4.0 | 4.0 | — | — | 77 |

TABLE 14

Results of abrasion resistance test, dry-cleaning test, and color-developing property in Examples C18

| | | | Abrasion resistance test | | Dry-cleaning test | Color-developing property | | Degree of |
|---|---|---|---|---|---|---|---|---|
| | Pretreatment agent | Ink | Dry | Wet | | Saturation | OD | Whiteness |
| Hemp | Pretreatment agent C1 (Printed fabric sample C6) | Bk1 | 4.0 | 4.0 | 4.0 | — | 1.21 | — |
| | | C1 | 4.0 | 4.0 | 4.0 | 43 | — | — |
| | | M1 | 4.0 | 4.0 | 4.0 | 45 | — | — |
| | | Y1 | 4.0 | 4.0 | 4.0 | 54 | — | — |
| | | W1 | 4.0 | 4.0 | 4.0 | — | — | 76 |
| Rayon fiber | Pretreatment agent C1 (Printed fabric sample C7) | Bk1 | 4.0 | 4.0 | 4.0 | — | 1.11 | — |
| | | C1 | 4.0 | 4.0 | 4.0 | 41 | — | — |
| | | M1 | 4.0 | 4.0 | 4.0 | 42 | — | — |
| | | Y1 | 4.0 | 4.0 | 4.5 | 52 | — | — |
| | | W1 | 4.0 | 4.0 | 4.5 | — | — | 72 |
| Acetate fiber | Pretreatment agent C1 (Printed fabric sample C8) | Bk1 | 4.0 | 4.0 | 4.0 | — | 1.15 | — |
| | | C1 | 4.0 | 4.0 | 4.0 | 43 | — | — |
| | | M1 | 4.5 | 4.5 | 4.0 | 42 | — | — |
| | | Y1 | 4.0 | 4.0 | 4.5 | 53 | — | — |
| | | W1 | 4.0 | 4.0 | 4.5 | — | — | 75 |
| Silk | Pretreatment agent C1 (Printed fabric sample C9) | Bk1 | 4.0 | 4.0 | 4.0 | — | 1.10 | — |
| | | C1 | 4.0 | 4.0 | 4.0 | 40 | — | — |
| | | M1 | 4.0 | 4.0 | 4.0 | 41 | — | — |
| | | Y1 | 4.0 | 4.0 | 4.5 | 52 | — | — |
| | | W1 | 4.0 | 4.0 | 4.0 | — | — | 71 |
| Nylon fiber | Pretreatment agent C1 (Printed fabric sample C10) | Bk1 | 4.0 | 4.0 | 4.0 | — | 1.16 | — |
| | | C1 | 4.0 | 4.0 | 4.0 | 40 | — | — |
| | | M1 | 4.0 | 4.0 | 4.0 | 42 | — | — |
| | | Y1 | 4.0 | 4.0 | 4.0 | 52 | — | — |
| | | W1 | 4.0 | 4.0 | 4.0 | — | — | 71 |
| Polyester fiber | Pretreatment agent C1 (Printed fabric sample C11) | Bk2 | 4.0 | 4.0 | 4.0 | — | 1.10 | — |
| | | C2 | 4.0 | 4.0 | 4.0 | 40 | — | — |
| | | M2 | 4.0 | 4.0 | 4.0 | 41 | — | — |
| | | Y2 | 4.0 | 4.0 | 4.0 | 50 | — | — |
| | | W2 | 4.0 | 4.0 | 4.0 | — | — | 70 |

TABLE 15

Results of abrasion resistance test, dry-cleaning test, and color-developing property in Comparative Examples C1 to C5

| | | | Abrasion resistance test | | Dry-cleaning test | Color-developing property | | Degree of |
|---|---|---|---|---|---|---|---|---|
| | Pretreatment agent | Ink | Dry | Wet | | Saturation | OD | Whiteness |
| Comparative Example C1 | Pretreatment agent C6 (Printed fabric sample C12) | Bk1 | 3.0 | 3.0 | 4.0 | — | 1.01 | — |
| | | C1 | 3.0 | 3.0 | 4.0 | 31 | — | — |
| | | M1 | 3.0 | 3.0 | 4.0 | 33 | — | — |
| | | Y1 | 3.0 | 2.5 | 4.0 | 39 | — | — |
| | | W1 | 2.0 | 2.0 | 4.0 | — | — | 22 |
| Comparative Example C2 | Pretreatment agent C7 (Printed fabric sample C13) | Bk1 | 3.0 | 1.5 | 4.0 | — | 1.18 | — |
| | | C1 | 3.0 | 1.5 | 4.0 | 41 | — | — |
| | | M1 | 3.5 | 2.0 | 4.5 | 41 | — | — |
| | | Y1 | 3.5 | 2.0 | 4.5 | 52 | — | — |
| | | W1 | 3.0 | 2.0 | 4.5 | — | — | 75 |
| Comparative Example C3 | Pretreatment agent C8 (Printed fabric sample C14) | Bk1 | 4.0 | 3.0 | 3.0 | — | 1.11 | — |
| | | C1 | 4.0 | 3.0 | 3.0 | 40 | — | — |
| | | M1 | 4.0 | 3.0 | 3.0 | 42 | — | — |
| | | Y1 | 4.0 | 3.5 | 3.0 | 52 | — | — |
| | | W1 | 4.0 | 3.5 | 3.5 | — | — | 76 |
| Comparative Example C4 | Pretreatment agent C9 (Printed fabric sample C15) | Bk1 | 3.0 | 3.0 | 2.5 | — | 1.23 | — |
| | | C1 | 3.0 | 3.0 | 3.0 | 42 | — | — |
| | | M1 | 3.0 | 3.0 | 3.0 | 44 | — | — |
| | | Y1 | 3.0 | 2.5 | 3.0 | 53 | — | — |
| | | W1 | 2.0 | 2.0 | 3.0 | — | — | 78 |

TABLE 15-continued

Results of abrasion resistance test, dry-cleaning test, and color-developing property in Comparative Examples C1 to C5

| | | | Abrasion resistance test | | Dry-cleaning test | Color-developing property | | |
|---|---|---|---|---|---|---|---|---|
| | Pretreatment agent | Ink | Dry | Wet | | Saturation | OD | Degree of Whiteness |
| Comparative Example C5 | Pretreatment agent C10 (Printed fabric sample C16) | Bk1 | 4.0 | 3.5 | 4.5 | — | 1.01 | — |
| | | C1 | 4.0 | 3.5 | 4.5 | 35 | — | — |
| | | M1 | 4.0 | 3.5 | 4.5 | 38 | — | — |
| | | Y1 | 4.0 | 4.0 | 4.5 | 40 | — | — |
| | | W1 | 4.0 | 4.0 | 4.0 | — | — | 50 |

What is claimed is:

1. An ink jet textile printing process comprising:
pretreating fabric with a pretreatment agent for ink jet textile printing before printing ink containing one or more polymer fine particles on the fabric, the pretreatment agent comprising:
at least water, a cationic polymer including polyallylamine series polymer, a non-ionic surfactant, and polymer fine particles, wherein
the polymer fine particles are an acrylic polymer;
the polymer fine particles have a glass transition temperature of −10° C. or less;
the polymer fine particles have a mass-average molecular weight of 100000 or more;
the polymer fine particles have an acid number of 50 mg KOH/g or less;
then printing the ink by an ink jet head on the fabric, the polymer fine particles contained in the ink have an acid number of 30 mg KOH/g to 100 mg KOH/g, the polymer fine particles contained in the ink contain alkyl (meth)acrylate or cyclic alkyl (meth)acrylate as a structural component, and the polymer fine particles contained in the ink having a carboxyl group,
wherein the fabric is made of one kind of fiber or blended fiber of two or more selected from the group consisting of cotton, hemp, rayon fiber, acetate fiber, silk, nylon fiber, and polyester fiber.

2. The ink jet textile printing process according to claim 1, wherein the ink jet head has an electrostrictive element that discharges the ink.

3. The ink jet textile printing process according to claim 2, wherein the ink includes a pigment serving as a color material and being self-dispersing or being dispersed in an acrylic resin.

4. The ink jet textile printing process according to claim 1, wherein the polymer fine particles contained in the ink have a glass transition temperature of −10° C. or less.

5. The ink jet textile printing process according to claim 1, wherein the polymer fine particles contained in the ink have a mass-average molecular weight in the range of about 100,000 to 1,000,000.

6. The ink jet textile printing process according to claim 1, wherein the polymer fine particles contained in the pretreatment agent contain alkyl (meth)acrylate or cyclic alkyl (meth)acrylate as a structural component.

7. The ink jet textile printing process according to claim 1, wherein the content of the alkyl (meth)acrylate or the cyclic alkyl (meth)acrylate is 70% or more of the total amount of the polymer fine particles contained in the ink.

8. The ink jet textile printing process according to claim 1, wherein the polyallylamine series polymer includes at least one of polyallylamine, polyallylamine sulfate, polyallylamine hydrochloride, allylamine/diallylamine copolymer, allylamine/diallylamine copolymer sulfate, allylamine/diallylamine copolymer hydrochloride, allylamine dimethylallylamine, allylamine/dimethylallylamine copolymer sulfate, allylamine/dimethylallylamine copolymer hydrochloride, diallylamine, diallylamine sulfate, diallylamine hydrochloride, methyldiallylamine amide, methyldiallylamine amide sulfate, methyldiallylamine amide hydrochloride, diallylamine sulfur dioxide copolymer, diallylamine sulfur dioxide copolymer sulfate, diallylamine sulfur dioxide copolymer hydrochloride, methyl diallylamine sulfur dioxide copolymer, methyldiallylamine sulfur dioxide copolymer sulfate, and methyldiallylamine sulfur dioxide copolymer hydrochloride.

9. The ink jet textile printing process according to claim 1, wherein the non-ionic surfactant comprises acetylene glycol surfactant.

10. The ink jet textile printing process according to claim 1, wherein the pretreatment agent further comprises a water-soluble organic solvent that comprises at least one of polyols, amines, monohydric alcohols, alkyl ethers of polyhydric alcohols, 2,2'-thiodiethanol, amides, heterocycles, and acetonitriles.

11. The ink jet textile printing process according to claim 1, wherein the pretreatment agent further comprises a water-soluble organic solvent that comprises at least one of polyols and alkyl ethers of polyhydric alcohols.

12. The ink jet textile printing process according to claim 1, wherein the cationic polymer has a function of aggregating the ink by acting on the carboxyl group of the polymer fine particles contained in the ink.

* * * * *